(12) United States Patent
Wilks

(10) Patent No.: US 11,191,210 B2
(45) Date of Patent: Dec. 7, 2021

(54) MANUALLY GUIDED GARDEN DEVICE

(71) Applicant: Robert Bosch GmbH, Stuttgart (DE)

(72) Inventor: Antony Wilks, Suffolk (GB)

(73) Assignee: Robert Bosch GmbH, Stuttgart (DE)

( * ) Notice: Subject to any disclaimer, the term of this patent is extended or adjusted under 35 U.S.C. 154(b) by 366 days.

(21) Appl. No.: 16/076,161

(22) PCT Filed: Mar. 16, 2017

(86) PCT No.: PCT/EP2017/056244
§ 371 (c)(1),
(2) Date: Aug. 7, 2018

(87) PCT Pub. No.: WO2017/158095
PCT Pub. Date: Sep. 21, 2017

(65) Prior Publication Data
US 2021/0185912 A1    Jun. 24, 2021

(30) Foreign Application Priority Data

Mar. 17, 2016 (DE) .................... 10 2016 204 403.6
Mar. 16, 2017 (DE) .................... 10 2017 204 388.1

(51) Int. Cl.
*A01D 34/82*     (2006.01)
*A01D 34/69*     (2006.01)
*A01D 34/68*     (2006.01)
*A01D 101/00*    (2006.01)

(52) U.S. Cl.
CPC .......... *A01D 34/824* (2013.01); *A01D 34/69* (2013.01); *A01D 2034/6843* (2013.01); *A01D 2101/00* (2013.01)

(58) Field of Classification Search
CPC .. A01D 34/6806; A01D 34/824; A01D 34/69; A01D 2034/6843; A01D 2034/6825
See application file for complete search history.

(56) References Cited

U.S. PATENT DOCUMENTS 2,937,706 A * 5/1960 Chandler ................ B60K 1/00
                                                180/19.3
3,225,853 A * 12/1965 Norton .................. B62B 5/0026
                                                180/19.3
(Continued)

FOREIGN PATENT DOCUMENTS

CN   101116393 A   2/2008
CN   202738450 U   2/2013
(Continued)

OTHER PUBLICATIONS

International Search Report corresponding to PCT Application No. PCT/EP2017/056244, dated Apr. 25, 2017 (German and English language document) (5 pages).

*Primary Examiner* — Abigail A Risic
(74) *Attorney, Agent, or Firm* — Maginot, Moore & Beck LLP

(57) ABSTRACT

A manually guided garden care machine includes at least one base unit and at least one guide unit having at least one handle. The manually guided garden care machine further includes at least one sensing unit configured to sense an operator's wish for assistance in propelling the at least one base unit and further configured to sense a deformation of at least one sub-region of the at least one guide unit.

20 Claims, 10 Drawing Sheets

(56) References Cited

U.S. PATENT DOCUMENTS

| | | | |
|---|---|---|---|
| 2009/0266042 A1* | 10/2009 | Mooney | A01D 34/78 56/11.9 |
| 2010/0025124 A1* | 2/2010 | Arpino | B62D 51/04 180/19.3 |
| 2013/0046448 A1* | 2/2013 | Fan | A01D 34/824 701/50 |
| 2015/0373906 A1 | 12/2015 | Jagenstedt et al. | |
| 2016/0037719 A1* | 2/2016 | Bian | A01D 69/02 56/10.8 |
| 2020/0107497 A1* | 4/2020 | Ferrell | A01D 34/824 |
| 2020/0375102 A1* | 12/2020 | Arendt | A01D 34/69 |

FOREIGN PATENT DOCUMENTS

| | | |
|---|---|---|
| CN | 104582468 A | 4/2015 |
| CN | 204858184 U | 12/2015 |
| EP | 2 805 597 A1 | 11/2014 |
| FR | 2 755 573 A1 | 5/1998 |

\* cited by examiner

MANUALLY GUIDED GARDEN DEVICE

This application is a 35 U.S.C. § 371 National Stage Application of PCT/EP2017/056244, filed on Mar. 16, 2017, which claims the benefit of priority to Serial No. DE 10 2016 204 403.6, filed on Mar. 17, 2016 in Germany, and Serial No. DE 10 2017 204 388.1, filed on Mar. 16, 2017 in Germany, the disclosures of which are incorporated herein by reference in their entirety.

BACKGROUND

There has already been proposed, in FR 2 755 573, a manually guided garden care machine, in particular a push lawnmower, comprising at least one base unit, at least one guide unit, which has at least one handle, and at least one sensing unit, which is designed to sense an operator's wish for assistance in propelling the base unit.

SUMMARY

The disclosure is based on a manually guided garden care machine, in particular a push lawnmower, comprising at least one base unit, at least one guide unit, which has at least one handle, and at least one sensing unit, which is designed to sense an operator's wish for assistance in propelling the base unit.

It is proposed that the at least one sensing unit be designed to sense a deformation of at least one sub-region of the guide unit. Preferably, the sensing unit is designed to sense an operator's wish for assistance in moving the manually guided garden care machine. Particularly preferably, the manually guided garden care machine has, in particular, a drive unit realized as an assistance drive, which is designed at least to assist an operator in moving, in particular in pushing, the manually guided garden care machine. Preferably, the sensing unit is designed to sense a relative movement of at least two opposite ends of the sub-region of the guide unit. A "manually guided garden care machine" in this context is to be understood to mean, in particular, a garden care machine that is guided directly by an operator. Preferably, it is to be understood to mean, in particular, a garden care machine that at least partly is moved, in particular pushed, directly, by an operator. Preferably, the garden care machine is realized as a push lawnmower. The garden care machine in this case may have a drive unit, realized as an assistance drive, for assisting the operator in pushing the garden care machine over an area on which work is to be performed. Likewise conceivable are other designs of the garden care machine, considered appropriate by persons skilled in the art, such as, for example, a design of the garden care machine as a mulcher, a lawn aerator, as a scarifier, etc. In addition, a "garden care machine" in this context is to be understood to mean, in particular, a unit that, during operation, is supported at least substantially directly, in particular via wheels or the like, on an area on which work is to be performed. Preferably, during operation the unit is moved, in particular by an operator, by means of the guide unit, over the area on which work is to be performed. Particularly preferably, the base unit has, in particular, a work unit such as, in particular, a mowing unit, that is designed to work the area on which work is to be performed. Furthermore, a "guide unit" in this context is to be understood to mean, in particular, a unit that, during operation, is at least partly contacted directly by an operator for the purpose of guiding the garden care machine. Preferably, it is to be understood to mean, in particular, a unit by means of which the base unit of the garden care machine is moved, in particular, pushed, in a regular manner during operation. Particularly preferably, the guide unit has a handle, in particular a handlebar, for contacting by the operator.

In addition, a "sensing unit" in this context is to be understood to mean, in particular, a unit designed to sense at least one characteristic quantity from which an operator's wish for assistance in propelling the base unit can be deduced. Preferably, it is to be understood to mean, in particular, a unit designed to sense at least one characteristic quantity of the guide unit from which an operator's wish for assistance in propelling the base unit can be deduced. Particularly preferably, it is to be understood to mean, in particular, a unit designed to sense a force, in particular exerted by an operator, upon the guide unit. Preferably, for this purpose the sensing unit has in particular at least one sensor. Furthermore, a "deformation of at least one sub-region of the guide unit" is to be understood to mean, in particular, a relative movement of two points of the sub-region relative to each other. Preferably, it is to be understood to mean, in particular, a relative movement of two points of the sub-region of the guide unit that are connected to each other. Preferably, the two points of the sub-region of the guide unit are connected to each other in a fixed, preferably integral, manner, and particularly preferably in a rigid manner. Particularly preferably, it is to be understood to mean, in particular, a relative movement of two regions of the guide unit that are connected via the sub-region of the guide unit, the other regions being connected, in particular rigidly, via the sub-region. "In an integral manner" is to be understood to mean, in particular, connected at least in a materially bonded manner, for example by a welding process, an adhesive process, an injection process and/or another process considered appropriate by persons skilled in the art, and/or, advantageously, formed in one piece such as, for example, by being produced from a casting and/or by being produced in a single or multi-component injection process and, advantageously, from a single blank. "Designed" is to be understood to mean, in particular, specially programmed, configured and/or equipped. That an object is designed for a particular function, is to be understood to mean, in particular, that the object fulfils and/or executes this particular function in at least one application state and/or operating state.

The manually guided garden care machine as designed according to the disclosure makes it possible, advantageously, to sense an operator's wish for assistance in propelling the base unit. Preferably, advantageously, it is thereby possible to reliably sense a characteristic quantity that can be used to control a drive unit realized as an assistance drive. In addition, in particular, an advantageously intuitive operation of the manually guided garden care machine can thereby be achieved.

It is additionally proposed that the at least one sensing unit have at least one sensor that is arranged in a central region of the guide unit, between the handle and a region of connection to the base unit. Preferably, the at least one sensing unit has at least two sensors, which are respectively arranged on opposite sides of the guide unit, in a central region of the guide unit, between the handle and a region of connection to the base unit. Preferably, the handle is connected to the base unit via two connection units in particular guide rods. Particularly preferably, respectively one of the sensors is arranged in or on respectively one of the connection units. Preferably, the at least one sensor of the sensing unit is arranged in a region close to the at least one handle, in a central region of the guide unit. A "sensor" in this context is to be understood to mean, in particular, a unit designed to pick up at least one characteristic quantity and/or a physical property, the pick-up being able to be effected actively, such as, in particular, by generating and emitting an electrical measurement signal, and/or passively, such as, in particular, by sensing of property changes of a sensor component. Various sensor units, considered appropriate by persons skilled in the art, are conceivable. In addition, a "central region" in this context is to be understood to mean, in particular, a spatial region that is spaced apart from both the handle and the region of connection to the base unit. Preferably, the central region is defined by a notional cuboid that delimits the spatial region and forms a central sub-cuboid of a smallest notional cuboid that only just fully encompasses the guide unit. The smallest notional cuboid in this case is divided into an upper sub-cuboid, a middle sub-cuboid and a lower sub-cuboid, in particular in a direction from the handles to the region of connection. The upper and the lower sub-cuboid each form, in particular, at least 5%, preferably at least 10%, and particularly preferably at least 20% of a volume of the smallest notional cuboid. The middle sub-cuboid forms, in particular, maximally 90%, preferably maximally 80%, and particularly preferably maximally 60% of a volume of the smallest notional cuboid. In particular, an advantageously protected arrangement of the sensor of the sensing unit can thereby be achieved. In particular, owing to the height of the arrangement, protection against low plants can be achieved. In addition, owing to the distance from the handle, in particular a reliable measurement result of the sensor of the sensing unit can be ensured. A high moment can be provided.

Alternatively, however, it would also be conceivable for the sensing unit to have at least one sensor that is arranged in a handle and/or a handlebar of the guide unit. Preferably, the at least one sensing unit has at least two sensors, which are arranged in respectively one handle of the guide unit. In particular, an advantageously protected arrangement of the sensor of the sensing unit can thereby be achieved. In particular, owing to the height of the arrangement, protection of damage, for example by low plants, can be achieved. In addition, it is thereby also possible to monitor whether an operator's hands are on the handles of the guide unit.

Furthermore, it is proposed that the at least one sub-region of the guide unit have a lesser bending stiffness in comparison with an adjoining region of the guide unit. Preferably, the at least one sub-region of the guide unit has a significantly lesser bending stiffness in comparison with an adjoining region of the guide unit. Particularly preferably, the at least one sub-region of the guide unit has a significantly lesser bending stiffness in comparison with a remainder of the guide unit. A "bending stiffness" in this context is to be understood to mean, in particular, a characteristic quantity that describes the resistance of a body against elastic deformation by a force, in particular by a bending moment. That "the at least one sub-region of the guide unit" has "a lesser bending stiffness in comparison with an adjoining region of the guide unit" in this context is to be understood to mean, in particular, that a value of a bending stiffness of the sub-region of the guide unit is maximally 80%, preferably maximally 60%, more preferably maximally 40%, and particularly preferably maximally 20% of a value of a bending stiffness of the adjoining region of the guide unit. Preferably, the bending stiffness of the regions in this case is viewed, in particular, in the same axis and/or in axes that are parallel to each other. Particularly preferably, a notional load, relative to which the bending stiffness is considered, is effected parallel to a regular ground plane of the manually guided garden care machine. The lesser bending stiffness may be achieved in this case, in particular, by a material selection, a shape such as, in particular, a cross section, and/or other measures considered appropriate by persons skilled in the art. This makes it possible, in particular, for a deformation to be sensed in a reliable manner.

Preferably, an advantageously high measurement amplitude of the sensing unit can thereby be achieved. In particular, it is thereby possible to achieve, in particular, advantageously precise sensing. In addition, it can thereby be achieved, in particular, that a deformation is channeled, at least partly, onto the sub-region.

Alternatively, however, it would also be conceivable for the at least one sub-region of the guide unit to have a lesser modulus of elasticity in comparison with an adjoining region of the guide unit. Preferably, at least one sub-region of the handles of the guide unit, in particular a grip surface provided for contacting by an operator, has a low modulus of elasticity. Preferably, in particular, an outer covering of the handles of the guide unit is slightly deformable. Particularly preferably, the at least one sensor of the sensing unit is located under an outer covering of one of the handles of the guide unit. That "the at least one sub-region of the guide unit has a lesser modulus of elasticity in comparison with an adjoining region of the guide unit" in this context is to be understood to mean that a value of a modulus of elasticity of the sub-region of the guide unit is maximally 80%, preferably maximally 60%, more preferably maximally 30%, and particularly preferably maximally 10% of a value of a modulus of elasticity of the adjoining region of the guide unit. This makes it possible, in particular, for a deformation to be sensed in a reliable manner. In particular, it is thereby possible to achieve, in particular, advantageously precise sensing. In addition, in can thereby be achieved, in particular, that a deformation is channeled, at least partly, onto the sub-region.

Furthermore, it is proposed that the at least one sensing unit have at least one electrical sensor. Preferably, the sensing unit has at least two electrical sensors, which, in particular, are respectively arranged on opposite sides of the guide unit. Preferably, respectively one of the sensors is arranged in or on respectively one of the connection units. Particularly preferably, a signal of the sensors is in each case sensed separately from one another. The electrical sensor in this case may be realized both as a passive and as an active sensor, and may additionally sense both a movement and a deformation. Active sensors normally require, in particular, amplification and/or signal processing in order to achieve a usable signal, but for this may also sense small deformations or movements. Passive sensors, by contrast, do not require any electronics, but for this a greater deformation or movement. The at least one electrical sensor is realized, in particular, as a force detector, in particular as a bridge circuit having four strain gauges, as an inductive sensor, as a force sensing resistor (FSR), as a Hall sensor and/or as a strain gauge. In principle, however, another design of the sensor, considered appropriate by persons skilled in the art, is also conceivable. However, also conceivable in principle is a combination of sensors such as, in particular, by sensor fusion. This makes it possible, in particular, to produce an advantageously reliable sensing unit. In particular, this makes it possible to achieve an advantageously accurate measurement result. If two electrical sensors are used, in particular deformations that differ between a left and a right side can be sensed. In particular, it can thereby be sensed when an operator applies a greater load to one side than to the other. In addition, it can thereby be sensed when an operator wishes to go round a bend.

It is additionally proposed that the at least one electrical sensor of the sensing unit be constituted by a strain gauge. Preferably, the at least two electrical sensors of the sensing unit are each constituted by a strain gauge. In principle, however, it would also be conceivable for only one of the electrical sensors to be constituted by a strain gauge, and the second electrical sensor to be constituted by an alternative, in particular, more favorable, sensor such as, for example, a temperature sensor. As a result, in particular, an advantageously reliable sensing unit can be provided. Preferably, a particularly reliable electrical sensor can thereby be provided. In addition, in particular, an advantageously robust and inexpensive electrical sensor can thereby be provided. In addition, it is thereby possible to provide, in particular, a sensor that requires only a very slight measuring deflection. It can thereby be made possible for the guide unit to remain substantially rigid, and undergo merely an imperceptible deformation. Alternatively, however, it would also be conceivable for the at least one electrical sensor of the sensing unit to be constituted by a pressure sensor such as, for example, a piezoelectric sensor.

It is further proposed that the sensing unit be designed to sense at least one characteristic quantity of a mechanical stress in the at least one sub-regions of the guide unit. Preferably, the sensing unit is designed to sense at least one characteristic quantity of the deformation of at least one sub-region of the guide unit. Preferably, respectively at least one characteristic quantity of a mechanical stress in the at least one sub-regions of the guide unit is sensed by means of the at least one sensor, preferably by means of the at least two sensors, of the sensing unit, separately from each other in each case. Various characteristic quantities of a mechanical stress, considered appropriate by persons skilled in the art, are conceivable, but in particular this is to be understood to mean a direction and/or an intensity of a mechanical stress, in particular of the deformation. In the case of a direction, a distinction can preferably also be made only between two directions. Preferably, both a direction and an intensity of the mechanical stress, in particular of the deformation, is sensed, a direction preferably being determined by a plus or minus sign of the intensity. This makes it possible, advantageously, to reliably sense a characteristic quantity that can be used to control a drive unit realized as an assistance drive. In addition, in particular, advantageously intuitive operation of the manually guided garden care machine can thereby be achieved. Furthermore, advantageously accurate sensing of an operator's intention can be achieved by sensing of a direction and/or intensity of the mechanical stress, or the deformation. Advantageously, by sensing of a direction, a distinction can be made between pushing and pulling by an operator. Advantageously, by sensing of an intensity, an intensity of the wanted assistance can be sensed. As a result, the sensing unit may advantageously be designed both to activate and to control a degree, in particular a speed, of the assistance.

It is additionally proposed that the sensing unit be designed at least to sense a direction of a mechanical stress in the at least one sub-region of the guide unit. Preferably, the sensing unit is designed at least to sense a direction of a deformation of the at least one sub-region of the guide unit. Particularly preferably, in the case of the direction, a distinction is made between at least two opposite directions. Preferably, the sensing unit has at least two sensors, which are respectively designed at least to sense a direction of a mechanical stress in respectively one sub-region of the guide unit. This makes it possible, advantageously, to reliably sense a characteristic quantity that can be used to control a drive unit realized as an assistance drive. In addition, in particular an advantageously intuitive operation of the manually guided garden care machine can thereby be achieved. Advantageously, by sensing of a direction, a distinction can be made between pushing and pulling by an operator. If two sensors are used, in particular deformation directions that differ between a left and a right side can be sensed. In particular, it can thereby be sensed when an operator applies load to one side, as against the other side. In addition, it can thereby be sensed when an operator wishes to go round a bend.

Furthermore, it is proposed that the at least one guide unit have at least one guide rod, which extends from the handle to the base unit, and which has at least one offset, located in the at least one sub-region. Preferably, the offset is constituted by a parallel offset. Preferably, at the offset the at least one guide rod has at least two sub-rods, which are parallel to each other and arranged in an offset manner in relation to each other. Particularly preferably, the sub-rods of the guide rod are connected to each other via a connection element, in particular a connection plate. Preferably, the guide unit has two guide rods, which each have an offset. An "offset" in this context is to be understood to mean, in particular, that a central axis of the guide rod deviates in the region of the offset. Preferably, it is to be understood to mean, in particular, that a notional first tangent that touches the central axis of the guide rod in front of the offset are arranged in an offset manner relative to a second tangent that touches the central axis of the guide rod behind the offset. Preferably, the tangents are arranged in an offset manner parallel to each other. Particularly preferably, a least offset of the tangents in the region of the offset is at least 0.1 cm, preferably at least 0.5 cm, and particularly preferably at least 1 cm. In particular, an advantageous guide unit can thereby be provided. In addition, the sub-region can thereby be created by simple design means. In particular, the sub-region can thereby be achieved, by simple design means, with a lesser bending stiffness.

It is additionally proposed that the at least one sensing unit have at least one sensor that is arranged in a region of the offset. Preferably, the at least one sensor of the at least one sensing unit is arranged, in particular, at the offset. Preferably, the at least one sensor of the at least one sensing unit is arranged on the connection element, in particular the connection plate of the guide rod. Particularly preferably, the at least one sensing unit has at least two sensors, which are respectively arranged on an offset of a guide rod. In particular, an advantageously reliable arrangement of the sensors can thereby be achieved. In particular, an arrangement can thereby be created with which advantageously reliable sensing of a deformation of the sub-region of the guide unit can be achieved.

It is further proposed that the manually guided garden care machine have at least one computing unit that, for the purpose of controlling a drive unit, is designed to evaluate sensor data of the sensing unit, and to evaluate at least one current operating characteristic quantity of the manually guided garden care machine. Preferably, for the purpose of controlling a drive unit, realized as an assistance drive, for moving the manually guided garden care machine, the at least one computing unit is designed to evaluate sensor data of the sensing unit, and to evaluate at least one current operating characteristic quantity of the manually guided lawnmower. Preferably, the at least one computing unit is designed to control a drive unit of the manually guided garden care machine, realized as an assistance drive, in dependence on a sensed deformation of the at least one sub-region of the guide unit and in dependence on a sensed current operating characteristic quantity of the manually guided garden care machine. Particularly preferably, the computing unit is designed to deduce, from a sensed deformation of the at least one sub-region of the guide unit, and from a sensed current operating characteristic quantity of the manually guided garden care machine, an operator's wish for propelling assistance. The computing unit is designed, in particular, to deduce, from a sensed deformation and from a sensed current operating characteristic quantity, assistance required by the operator to facilitate a current pushing operation. Various current operating characteristic quantities, considered appropriate by persons skilled in the art, are conceivable, but this is to be understood to mean, in particular, a current position and/or a current speed. In addition, various realizations of the drive unit, considered appropriate by persons skilled in the art, are conceivable, such as, in particular, as an internal-combustion engine and/or, particularly preferably, as an electric motor. A "computing unit" in this context is to be understood to mean, in particular, a unit having an information input, an information processing system and an information output. Advantageously, the computing unit has at least one processor, a memory, input and output means, further electrical components, an operating program, closed-loop control routines, open-loop control routines and/or calculation routines. Preferably, the components of the computing unit are arranged on a common printed circuit board and/or advantageously in a common housing. In particular, advantageously reliable control of the drive unit can thereby be achieved. In particular, it is thereby possible to provide, in particular, advantageously intelligent and user-friendly control of the drive unit. Preferably, it is thereby possible to achieve control of the drive unit that is advantageous for an operator.

It is additionally proposed that the manually guided garden care machine have at least one setting element, which is used to set a sensitivity of the sensing unit. Preferably, the setting element is designed to set a factor by which the deformation of the at least one sub-region of the guide unit is taken into account for a calculation of propelling assistance. Preferably, the setting element is realized as a threshold transducer for setting the sensitivity of the strain gauge. Particularly preferably, the setting element is used by an operator to input a factor by which the user's weight and/or strength and/or required degree of assistance is taken into account. Preferably, the setting element is arranged on the guide unit. Preferably, the setting element is designed as a rotary handle. In principle, however, an alternative arrangement and/or design would also be conceivable. A "setting element" in this context is to be understood to mean, in particular, an element by means of which settings can be effected, in particular by an operator. Preferably, it is to be understood to mean, in particular, an element designed to receive an input quantity from an operator during a setting operation. Preferably, the element is designed to be contacted, in particular directly, by an operator, a touching of the setting element and/or an actuating force applied to the operating element and/or change in a setting of the setting element effected by an operator being sensed by the setting element. In principle, however, only a current setting of the setting element may also be sensed. Advantageously, individualization can thereby be effected by the operator. In particular, an operator can thus adjust the assistance to their requirements, such as, in particular, their weight and/or their strength and/or their required degree of assistance. A high degree of user-friendliness can be achieved.

Furthermore, it is proposed that the manually guided garden care machine have at least one actuating unit, which is arranged on the guide unit and which comprises at least one movably mounted actuating element that is designed to activate a stand-by operating state. The actuating element is preferably rotatably mounted. Preferably, the actuating element is mounted so as to be rotatable along an angular range that, in particular, is less than 360°, preferably less than 270°, and particularly preferably less than 180°. Preferably, the actuating element is arranged on the guide unit of the manually guided garden care machine. Various designs of the actuating element, considered appropriate by persons skilled in the art, are conceivable, but preferably the actuating element is realized as an actuating bail that is rotatably mounted on the guide unit. Particularly preferably, the actuating element is realized as a dead-man's actuating element. A "stand-by operating state" in this context is to be understood to mean, in particular, an operating state in which the manually guided garden care machine is ready for operation. Preferably, it is to be understood to mean, in particular, an active operating state of the manually guided garden care machine, in which, however, actual useful functions can be deactivated. Preferably, it is to be understood to mean, in particular, an operating state in which the sensing unit is active, such that propelling assistance can be used. In particular, a high degree of safety of the manually guided garden care machine can thereby be achieved. In addition, in particular, a high degree of operator convenience can thereby be achieved.

The disclosure is additionally based on a method for operating a manually guided garden care machine. It is proposed that a drive unit of the manually guided garden care machine be controlled at least in dependence on a deformation of a sub-region of a guide unit of the manually guided garden care machine. Preferably the drive unit of the manually guided garden care machine is controlled at least in dependence on a direction and/or an intensity of the deformation of the sub-region of the guide unit of the manually guided garden care machine. Preferably the drive unit of the manually guided lawnmower is additionally guided at least in dependence on an operating characteristic quantity of the manually guided garden care machine. Particularly preferably, the drive unit is realized as an assistance drive that is designed at least to assist an operator in a movement, in particular, in pushing the manually guided garden care machine. In particular, advantageously reliable control of the drive unit can thereby be achieved. In particular, it is thereby possible to provide, in particular, advantageously intelligent and user-friendly control of the drive unit. Preferably, it is thereby possible to achieve control of the drive unit that is advantageous for an operator.

It is further proposed that a travel assistance mode be put into a stand-by operating state by actuation of an actuating element of an actuating unit of the manually guided garden care machine. Preferably, a useful function of the manually guided garden care machine, in particular of a mowing unit, is also put into a stand-by operating state by actuation of the actuating element of the actuating unit. Preferably, the actuating element must be continuously actuated during operation by an operator. Particularly preferably, the functions of the manually guided garden care machine are deactivated as soon as the actuating element is released. An advantageously high degree of operator safety can thereby be achieved. In addition, despite everything, an advantageously high degree of user-friendliness can be achieved.

It is additionally proposed that the drive unit of the manually guided garden care machine in the stand-by operating state be controlled at least in dependence on a value of a sensed deformation of at least one sub-region of a guide unit. Preferably, the drive unit of the manually guided garden care machine in the stand-by operating state is controlled at least in dependence on a value of a sensed deformation of at least one sub-region of a guide unit, and at least in dependence on a set value of the setting element of the manually guided garden care machine. The manually guided garden care machine therefore assists an operator, in particular as soon as the manually guided garden care machine has been brought into the stand-by operating state, in dependence on a deformation of the sub-region of the guide unit. The deformation of the sub-region of the guide unit in this case occurs, in particular, when the manually guided garden care machine is pushed by an operator. It is thereby possible to achieve, in particular, control of the drive unit that is advantageously reliable and, for the operator, intuitive. In particular, it is thereby possible to provide, in particular, advantageously intelligent and user-friendly control of the drive unit for the purpose of assisting the operator. In addition, advantageously, individualization can be effected by the user by means of the setting element. In particular, an operator can thus adjust the assistance to their requirements, such as, in particular, their weight and/or their strength and/or their required degree of assistance.

It is further proposed that the drive unit of the manually guided garden care machine in the stand-by operating state be started in dependence on at least one usage behavior parameter. Preferably, the drive unit of the manually guided garden care machine in the stand-by operating state is started upon sensing of at least one defined behavior of usage of the garden care machine by the operator. Preferably, for this purpose a plurality of starting behavior profiles are stored on the garden care machine. The starting behavior profiles preferably comprise various force patterns that each define a minimum force beyond various measurement points. The starting behavior profiles in this case are defined in particular over measurement windows of the sensing unit, over a defined time period, in particular having a specific number of measurement points, within which window a specific number of measurement points must exceed a predefined minimum force. Preferably, the measurement window of the starting behavior profile in each case comprises at least three measurement points, of which more than two measurement points must exceed the predefined minimum force. The drive unit of the manually guided garden care machine in the stand-by operating state is therefore preferably started when at least one starting behavior profile has been fulfilled. It can thereby be taken into account that not every operator uses the garden care machine in the same way, or also that an operator uses the garden care machine differently according to the situation. There are thus various starting behavior profiles, in order to take account of various starting scenarios. In particular, rapid starting of the drive unit can thereby be ensured. In particular, it is possible to achieve an advantageously intuitive and rapid reaction of the manually guided garden care machine to the application of force by the operator. On the other hand, starting of the drive unit during pulling back can thereby be reliably avoided. For example, errors resulting from ground undulations can thereby be avoided, since these do not result in an application of force of uniform magnitude over the measurement window.

It is additionally proposed that, in a travel mode, the deformation of the sub-region of the guide unit be regulated to a defined value or value range by control of the drive unit. Preferably, in a travel mode, the force exerted upon the guide unit by an operator is regulated to a defined value or value range by control of the drive unit. Preferably, a force sensed by the sensing unit is regulated at least to less than 10 N, preferably at least to less than 7 N, and preferably at least to more than 0 N, particularly preferably to more than 3 N. Preferably, the force sensed by the sensing unit is regulated at least to a value range of from 4 N to 7 N, in particular to a value of approximately 4 N. For the purpose of regulating the force, exerted by an operator upon the guide unit, to a defined value or value range, the drive unit in particular is accelerated upon the defined value or value range being exceeded, and is braked upon the defined value or value range being under-run. In particular, advantageously intuitive control of the manually guided garden care machine can thereby be achieved. In particular, it can thereby be achieved that the manually guided garden care machine can be pushed at a constant speed, even with the application of a small amount of force.

Furthermore, it is proposed that the drive unit of the manually guided garden care machine in a travel mode be stopped in dependence on at least one usage behavior parameter. Preferably, the drive unit of the manually guided garden care machine in a travel mode is stopped upon sensing of at least one defined behavior of usage of the garden care machine by the operator. Preferably, for this purpose a plurality of stopping behavior profiles are stored on the garden care machine. The stopping behavior profiles preferably comprise various force patterns that each define a, in particular negative, minimum force beyond various measurement points. The stopping behavior profiles in this case are defined in particular over measurement windows of the sensing unit, over a defined time period, in particular having a specific number of measurement points, within which window a specific number of measurement points must exceed a predefined, in particular negative, minimum force. Preferably, the measurement window of the stopping behavior profile in each case comprises at least eight measurement points, of which more than six measurement points must exceed the predefined, in particular negative, minimum force. The drive unit of the manually guided garden care machine in the travel mode is therefore preferably stopped when at least one stopping behavior profile has been fulfilled. It is thereby possible to ensure, in particular, a rapid stopping of the drive unit. In particular, it is possible to achieve an advantageously intuitive and rapid reaction of the manually guided garden care machine to the application of force by the operator. On the other hand, inadvertent stopping of the drive unit, for example because of a ground undulation, can thereby be reliably avoided. It is therefore possible, for example, to avoid errors resulting from ground undulations, since these do not result in an application of force of uniform magnitude over the measurement window.

It is additionally proposed that an offset calibration of at least one sensor of at least one sensing unit of the manually guided garden care machine be performed automatically during operation, between at least two travel mode phases. Preferably, an offset calibration of the at least one sensor of the at least one sensing unit is performed automatically when the manually guided garden care machine is in an activated state, during a stationary phase of the manually guided garden care machine. Preferably, for this purpose an output value of the at least one sensor of the at least one sensing unit is sensed in the stationary phase, and an offset value is calculated in dependence thereon. If the calculated offset value differs from a stored offset value of the at least one sensor of the at least one sensing unit, the stored offset value is corrected, in particular at least in the direction of the calculated offset value. Preferably, during an offset calibration, the stored offset value can be corrected maximally by a defined factor. Preferably, the defined factor is in particular less than 10% of the stored offset value, preferably less than 5% of the stored offset value, and particularly preferably less than 1% of the stored offset value. Particularly preferably, the defined factor is in particular at least approximately 0.5% of the stored offset value. It is thereby advantageously possible to compensate measurement errors in the offset calibration, and to achieve a uniform adaptation of the offset value. The offset calibration therefore constitutes in particular an incremental method, over time, in which offset calibration errors due to operating conditions such as, for example, calibration on an incline, in particular on a steep slope, do not affect the performance of the calibration. It can thereby be achieved, in particular, that the garden care machine always behaves in a predictable manner. It is thereby also possible to compensate the fact that the at least one sensor gradually moves out of the calibration, owing to the change in its offset over time. In addition, for the operator, a manual calibration can be avoided because of the automatic calibration.

It is further proposed that a maximum speed of the drive unit of the manually guided garden care machine be adapted in dependence on an operating state of a mower unit of the garden care machine. Preferably, the maximum speed of the drive unit of the manually guided garden care machine is reduced in the case of a running mower unit. If, during mowing, the speed of the garden care machine is excessively high, an optimum mowing result can no longer be ensured, since both grass cutting and grass pick-up no longer function optimally. If the mower unit has been deactivated, on the other hand, the maximum speed of the drive unit of the manually guided garden care machine is preferably increased again. It is thereby possible to provide maximum convenience for the operator, without impairing a mowing result. In particular, it can be achieved that the garden care machine can be driven advantageously rapidly over paths, entrances or parking spaces.

The manually guided garden care machine according to the disclosure and the method are not intended to be limited to the application and embodiment described above. In particular, the manually guided garden care machine according to the disclosure and the method may have individual elements, components and units that differ in number from a number stated herein, in order to fulfill an operating principle described herein.

BRIEF DESCRIPTION OF THE DRAWINGS

Further advantages are disclosed by the following description of the drawing. Three exemplary embodiments of the disclosure are represented in the drawing. The drawing, the description and the claims contain numerous features in combination. Persons skilled in the art will also expediently consider the features individually and combine them to create appropriate further combinations.

There are shown.

DETAILED DESCRIPTION

Figure 1:
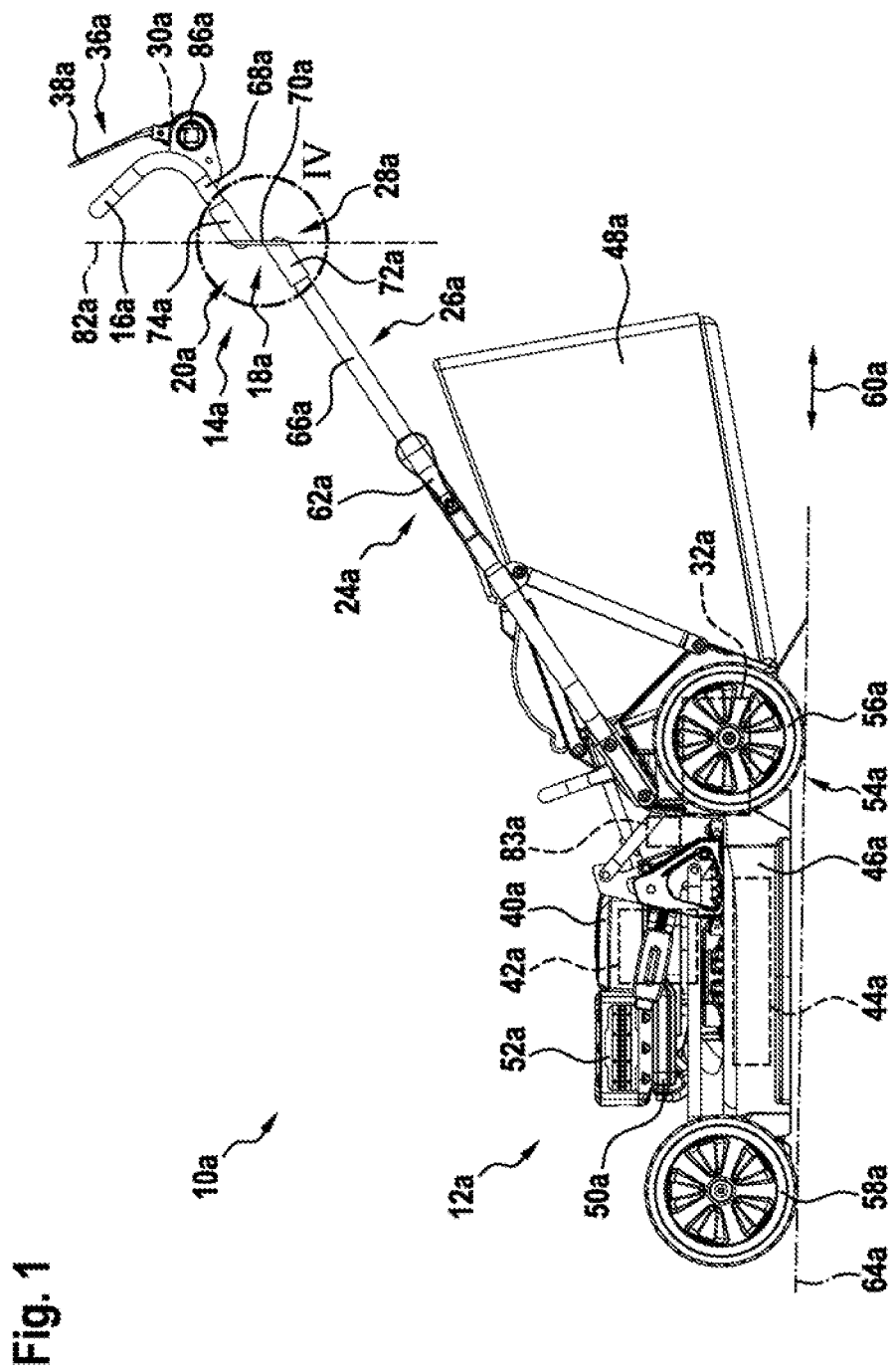
FIG. 1 a manually guided garden care machine, having a base unit, a guide unit and a sensing unit, in a schematic side view,
FIG. 2 the guide unit and the sensing unit of the manually guided garden care machine, in a schematic representation,
FIG. 3 the guide unit and the sensing unit of the manually guided garden care machine, in a schematic exploded representation,
FIG. 4 a detail IV-IV of the guide unit and the sensing unit, in a schematic side view,
FIG. 5 a fastening unit of the guide unit of the manually guided garden care machine, in a schematic exploded representation,
FIG. 6 a schematic flow diagram of a method for operating the manually guided garden care machine,
FIG. 7 a detail of a guide unit and a sensing unit of a manually guided garden care machine, in a schematic representation,
FIG. 8 a schematic flow diagram of a method for operating an alternative manually guided garden care machine,
FIG. 9 a schematic flow diagram of a sub-method for starting a drive unit of the alternative manually guided garden care machine,
FIG. 10 a schematic flow diagram of a sub-method for stopping the drive unit of the alternative manually guided garden care machine,
FIG. 11 a schematic flow diagram of a sub-method for offset calibration of a sensing unit of the alternative manually guided garden care machine,
FIG. 12 a schematic calibration structure for calibrating the sensing unit of the alternative manually guided garden care machine ex works,
FIG. 13 an alternative manually guided garden care machine, having a base unit, a guide unit and a sensing unit, in a schematic side view, and
FIG. 14 the guide unit and the sensing unit of the alternative manually guided garden care machine, in a schematic representation.
Figure 2:
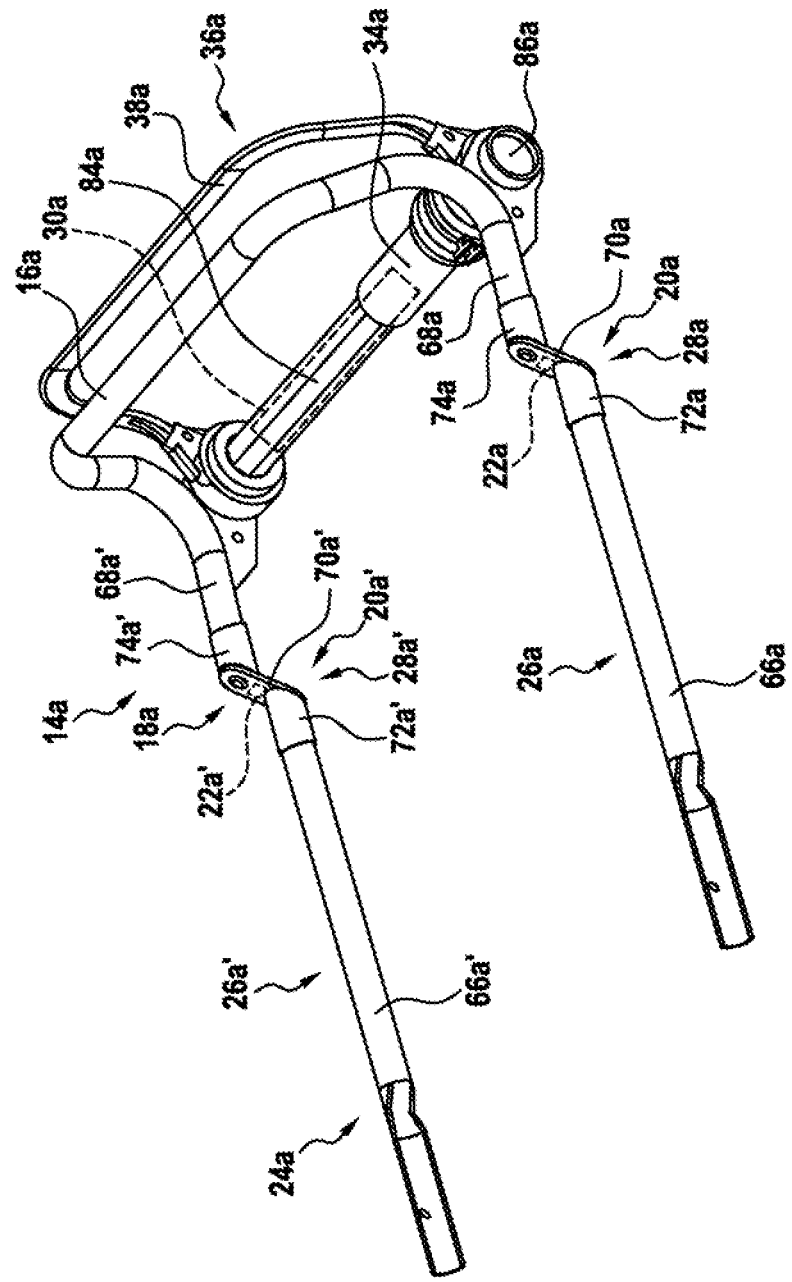
Figure 3:
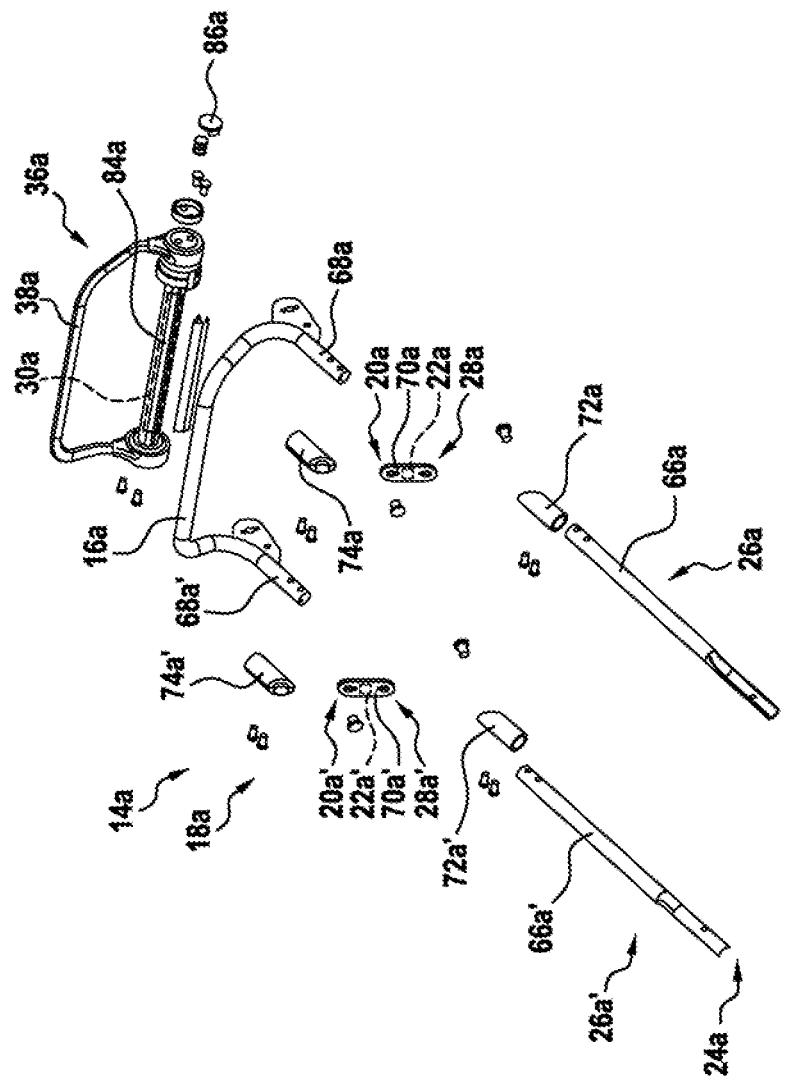
Figure 4:
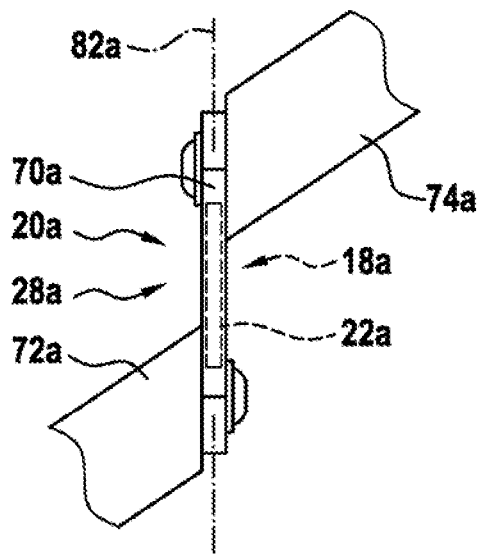
Figure 5:
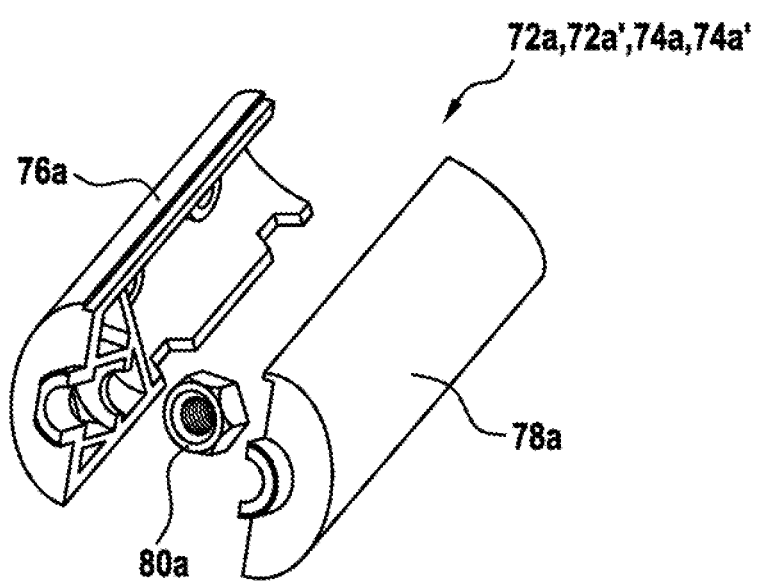

FIG. 1 shows a garden care machine 10a, which is realized as a lawnmower. The garden care machine 10a in this case is realized as an electrically operated lawnmower, which can be moved back and forth by an operator. The garden care machine 10a is thus realized as a so-called push lawnmower. In principle, however, a different realization, considered appropriate by persons skilled in the art, is also conceivable. The garden care machine 10a has a base unit 12a. The base unit 12a is designed, in particular, to be guided during operation directly over an area on which work is to be performed.

The garden care machine 10a has a drive unit 42a. The base unit 12a of the garden care machine 10a comprises the drive unit 42a. The drive unit 42a is constituted by an electric motor. In principle, however, a different realization of the drive unit 42a, considered appropriate by persons skilled in the art, would also be conceivable, such as, for example, as an internal combustion engine. In addition, the garden care machine 10a comprises at least one motor housing unit 40a, for accommodating and supporting the drive unit 42a of the garden care machine 10a. The base unit 12a comprises the motor housing unit 40a. In addition, the garden care machine 10a comprises at least one mower unit 44a, already known to persons skilled in the art, for performing work on a work area, in particular a grassed area. The base unit 12a comprises the mower unit 44a. The mower unit 44a is designed to mow grass growing on the work area. For this purpose, the mower unit 44a can be driven by the drive unit 42a. The mower unit 44a in this case may be realized such that it can be driven directly by the drive unit 42a, or the garden care machine 10a comprises at least one transmission unit, not represented in greater detail, which acts in combination with the drive unit 42a and the mower unit 44a, in particular is connected to the drive unit 42a and the mower unit 44a in order to effect driving. The transmission unit may be accommodated in a separate transmission housing unit of the garden care machine 10a or in the motor housing unit 40a.

The garden care machine 10a additionally comprises a removal transport unit 46a, which comprises a cutting space, in which a mowing mechanism of the mower unit 44a, already known to persons skilled in the art, is arranged such that it can be driven for the purpose of cutting grass. The base unit 12a comprises the removal transport unit 46a. The mower unit 44a is thus arranged in the cutting space of the removal transport unit 46a. The cutting space is arranged so as to directly adjoin a grass ejection opening of the removal transport unit 46a. The grass ejection opening leads into a removable grass receiving device 48a of the garden care machine 10a, for receiving and/or collecting green cuttings, in particular grass. The grass receiving device 48 is separably arranged on the base unit 12a of the garden care machine 10a.

The garden care machine 10a furthermore comprises at least one energy storage interface 50a for separable connection to at least one energy storage unit 52a. The base unit 12a comprises the energy storage interface 50a. The energy storage unit 52a in this case is realized as an accumulator battery. The energy storage interface 50a is arranged on the motor housing unit 40a. The energy storage interface 50a in this case has at least two interface elements, realized as connection guide rails, not represented in greater detail, which are of a design already known to persons skilled in the art. The energy storage interface 50a additionally comprises at least two contact elements, not represented in greater detail, for electrical connection to counter-contact elements, not represented in greater detail, of the energy storage unit 52a. The energy storage interface 50a also comprises at least one fixing element, not represented in greater detail, which is designed to fasten the energy storage unit 52a, at least in a state of having been arranged on the energy storage interface 50a, by means of a form-fitting and/or force-fitting connection.

In the design of the garden care machine 10a represented in FIG. 1, the energy storage interface 50a is designed to separably receive in total at least two energy storage units 52a. For the purpose of connecting the energy storage units 52a to the energy storage interface 50a, the energy storage units 52a can each be pushed onto the interface elements or inserted in the interface elements. A connection direction, along which the energy storage units 52a can be pushed on or inserted, in this case runs substantially transversely in relation to a rotation axis of the drive unit 42a. In particular, the connection direction runs at least substantially perpendicularly in relation to the rotation axis of the drive unit 42a. It is also conceivable, however, for the connection direction to run along a different direction, considered appropriate by persons skilled in the art, such as, for example, along a direction running substantially parallel to the rotation axis of the drive unit 42a.

For the purpose of moving the garden care machine 10a on a work area, in particular a grassed area, the garden care machine 10a has at least one running-gear unit 54a. The running-gear unit 54a is arranged on the base unit 12a. The running-gear unit 54a carries the base unit 12a on ground. The running-gear unit 54a in this case comprises at least two driving wheels 56a (only one of the two driving wheels 56a is visible in FIG. 1). The garden care machine 10a additionally has a further drive unit 32a. The drive unit 32a is constituted by an electric motor. The drive unit 32a is designed to propel the garden care machine 10a. The drive unit 32a is designed to drive the driving wheels 56a. The drive unit 32a is designed to provide propelling assistance to the base unit 12a during operation. By means of the propelling assistance to the base unit 12a, during operation of the garden care machine 10a an operator is at least assisted in pushing the garden care machine 10a. It is also conceivable, however, for the garden care machine 10a to have only one drive unit 32a, 42a, designed both to drive the mower unit 44a and to drive the driving wheels 56a. Moreover, it is conceivable for the garden care machine 10a to comprise a drive transmission unit, not represented in greater detail, by means of which a drive rotational speed and/or a drive torque of the drive wheels 56a can be set. The running-gear unit 54a additionally comprises at least one non-driven wheel 58a, in particular at least two non-driven wheels 58a, of which only one is represented. It is also conceivable, however, for the wheel 58a, in particular the wheels 58a, to be realized so as to be likewise drivable by means of the drive unit 32a.

The manually guided garden care machine 10a additionally has a guide unit 14a. The guide unit 14a is designed to directly guide the garden care machine 10a. By means of the guide unit 14a, the garden care machine 10a is moved in a regular manner, in particular pushed, during operation. The guide unit 14a is realized as a U shape, the two ends being fastened to the base unit 12a. The guide unit 14a has a handle 16a. The handle 16a is constituted by a handlebar. The handle 16a is realized partly in the form of a bail. The handle 16a is designed to be contacted by the operator during operation of the garden care machine 10a. The handle 16a extends substantially perpendicularly in relation to a direction of main extent 60a of the garden care machine 10a. A direction of main extent of the handle 16a extends perpendicularly in relation to a direction of main extent 60a of the garden care machine 10a. The direction of main extent 60a extends substantially parallel to an intended straight-ahead direction of the garden care machine 10a. The handle 16a extends parallel to a ground plane 64a of the garden care machine 10a. In addition, the guide unit 14a has two guide rods 26a, 26a'. The guide rods 26a, 26a' are realized substantially in the form of a rod. The guide rods 26a, 26a' are composed substantially of tubes. The tubes have a diameter of, for example, 26 mm. Various materials, considered appropriate by persons skilled in the art, are conceivable, such as, for example, a carbon fiber composite material, plastic or metal. The guide rods 26a, 26a' respectively adjoin the handle 16a, at the two opposite ends of the handle 16a. The guide rods 26a, 26a' extend substantially perpendicularly in relation to the handle 16a. A direction of main extent of the guide rods 26a, 26a' extends in each case substantially perpendicularly in relation to the direction of main extent of the handle 16a. The guide rods 26a, 26a' extend from the handle 16a to the base unit 12a. At an end that faces away from the handle 16a, the guide rods 26a, 26a' each form a region of connection 24a to the base unit 12a. In the region of connection 24a, when the guide unit 14a is in an assembled state, the guide rods 26a, 26a' are each inserted in fixing frames 62a of the base unit 12a, and fixed in place. The guide rods 26a are angled, relative to the ground plane 64a of the garden care machine 10a, by an angle of more than 20°, preferably of more than 25°, and preferably of more than 30°. Particularly preferably, the guide rods 26a, 26a' are at an angle of 34° relative to the ground plane 64a of the garden care machine 10a.

Furthermore, the garden care machine 10a has a sensing unit 18a. The sensing unit 18a is designed to sense an operator's wish for assistance in propelling the base unit 12a. The sensing unit 18a is designed to sense an operator's wish for assistance in moving the manually guided garden care machine 10a. In addition, the sensing unit 18a is designed to sense a deformation of at least one sub-region 20a, 20a' of the guide unit 14a. The sensing unit 18a is designed to sense a deformation of two mutually spaced apart sub-regions 20a, 20a' of the guide unit 14a. The sensing unit 18a is designed to sense a relative movement between respectively two opposite ends of the sub-regions 20a, 20a' of the guide unit 14a. The sub-regions 20a, 20a' respectively constitute a part of the guide rods 26a, 26a'. A first sub-region 20a constitutes a part of the first guide rod 26a. A second sub-region 20a' constitutes a part of the second guide rod 26a'. The sub-regions 20a, 20a' of the guide unit 14a have a lesser, in particular substantially lesser, bending stiffness in comparison with an adjoining region of the guide unit 14a. The sub-regions 20a, 20a' of the guide unit 14a have a lesser, in particular substantially lesser, bending stiffness in comparison with an adjoining region of the guide rods 26a, 26a'. The guide rods 26a, 26a' respectively have an offset 28a, 28a' that is located respectively in one of the sub-regions 20a, 20a'. The sub-regions 20a, 20a' are respectively constituted by the offsets 28a, 28a'. At the offsets 28a, 28a', the guide rods 26a, 26a' respectively have two sub-rods 66a, 66a', 68a, 68a', which are parallel to each other and arranged in an offset manner in relation to each other. The sub-rods 66a, 66a', 68a, 68a' of the same guide rod 26a, 26a' are respectively connected at the mutually facing ends via a connection element 70a, 70a'. The connection elements 70a, 70a' are respectively constituted by a connection plate. The sub-rods 66a, 66a', 68a, 68a' are respectively connected to the associated connection element 70a, 70a via a fastening unit 72a, 72a', 74a, 74a'. The fastening units 72a, 72a', 74a, 74a' are respectively arranged on the mutually facing ends of the sub-rods 66a, 66a', 68a, 68a'. The fastening units 72a, 72a', 74a, 74a' are respectively pushed onto the ends of the sub-rods 66a, 66a', 68a, 68a' and screw-connected to the latter. The fastening units 72a, 72a', 74a, 74a' are realized so as to be identical. The fastening units 72a, 72a', 74a, 74a' respectively have two half-shells 76a, 78a which, in an assembled state, form a sleeve for receiving an end of one of the sub-rods 66a, 66a', 68a, 68a'. In an assembled state, the half-shells 76a, 78a are screw-connected to each other through openings in an associated sub-rod 66a, 66a', 68a, 68a', and connected to the associated sub-rod 66a, 66a', 68a, 68a'. In addition, the half-shells 76a, 78a jointly constitute a receiving region for receiving a nut 80a. The fastening units 72a, 72a', 74a, 74a' respectively have a nut 80a which, in an assembled state, is arranged in a positionally and rotationally fixed manner in the receiving region of the half-shells 76a, 78a. A thread axis of the nut 80a, in an assembled state, is in each case angled in relation to a direction of main extent of the associated sub-rod 66a, 66a', 68a, 68a'. A thread axis of the nut 80a extends parallel to the ground plane 64 of the garden care machine 10a. By means of the nuts 80a, the connection elements 70a, 70a' are respectively connected to the fastening units 72a, 72a', 74a, 74a'. For this purpose, the connection elements 70a, 70a' respectively have two recesses, via which the connection elements 70a, 70a' are respectively screw-connected to the fastening units 72a, 72a', 74a, 74a'. A direction of main extent 82a of the connection elements 70a, 70a' in each case extends perpendicularly in relation to the ground plane 64 of the garden care machine 10a. The connection elements 70a, 70a' have a lesser, in particular substantially lesser, bending stiffness in comparison with the sub-rods 66a, 66a', 68a, 68a'. The lesser bending stiffness of the connection elements 70a, 70a' in this case results from a lesser material thickness and a lesser cross-sectional stiffness. In principle, however, it would also be conceivable that a bending stiffness can additionally be influenced by a material selection.

The sensing unit 18a has at least one sensor 22a, 22a'. The sensing unit 18a has at least one electrical sensor 22a, 22a'. The sensing unit 18a has two sensors 22a, 22a'. The use of sensors 22a, 22a' enables, in particular, full sensing of a force acting upon the guide unit 14a. As a result, in particular, reliable sensing can be ensured even if an operator is operating the handle 16a off-center. In addition, travel in bends, with force applied in partly differing directions by the operator, can thereby also be sensed in a reliable manner. The sensors 22a, 22a' are each constituted by an electrical sensor. The sensors 22a, 22a' are designed to sense a deformation of the two mutually spaced apart sub-regions 20a, 20a' of the guide unit 14a. The sensors 22a, 22a' are each designed to sense a deformation of one of the two sub-regions 20a, 20a' of the guide unit 14a. In addition, the sensors 22a, 22a' are arranged in a central region of the guide unit 14a, between the handle 16a and a region of connection 24a to the base unit 12a. The sensors 22a, 22a' are arranged on the guide rods 26a, 26a' of the guide unit 14a. The sensors 22a, 22a' are respectively arranged at one of the offsets 28a, 28a' of the guide unit 14a. The sensing unit 18a therefore has two sensors 22a, 22a', arranged in a region of the offsets 28a, 28a'. One of the two sensors 22a, 22a' is arranged at each of the offsets 28a, 28a' of the guide unit 14a. The sensors 22a, 22a' are respectively arranged on one of the connection elements 70a, 70a'. The sensors 22a, 22a' are realized such that they are partially integrated into the connection elements 70a, 70a'. In principle, it would also be conceivable for the sensors 22a, 22a' to be realized such that they are each fully integrated into respectively one of the connection elements 70a, 70a'. The sensors 22a, 22a' are arranged, in a manner that is not shown further, in a housing having a rubber seal. Ingress of dust or water can thereby be prevented. In principle, however, it would also be conceivable for the sensors 22a, 22a' to be arranged without the offset 28a, 28a'. An integrated arrangement of the sensors 22a, 22a' without the offset 28a, 28a' is likewise possible in principle, but involves higher costs.

The electrical sensors 22a, 22a' of the sensing unit 18a are each constituted by a strain gauge. In principle, however, it is also conceivable for the sensors 22a, 22a' each to comprise a plurality of strain gauges. For example, it would be conceivable for each of the sensors 22a, 22a' to be constituted by a bridge circuit having a plurality of strain gauges. For example, a quarter bridge, a half bridge and the full bridge, in particular having one, two or four strain gauges, are conceivable in this case. With the use of a full bridge it is possible, in particular, to provide the greatest sensitivity with, at the same time, advantageous environment compensation, in particular for temperature. In the case of the sensors 22a, 22a' it is additionally necessary to ensure an identical zero point. For this, in particular, ease of operation by an operator is expedient. In the case of sensors 22a, 22a' having such environment compensation, therefore, an advantageously optimal user interface can be provided.

In principle, however, a different arrangement of the sensors 22a, 22a' is also conceivable. For example, it would be conceivable for a controller to be fastened to the handle 16a, the sensors 22a, 22a' being attached to the joystick of the controller. In this case, the movements of the joystick in all directions could be monitored by electronics. The direction and the speed of the manually guided garden care machine 10*a* could thus be controlled by means of separately controllable driving wheels 56*a*.

The sensing unit 18*a* is additionally designed to sense a characteristic quantity of a mechanical stress in the sub-regions 20*a*, 20*a*' of the guide unit 14*a*. The sensing unit 18*a* is designed to sense a characteristic quantity of the deformation of the sub-regions 20*a*, 20*a*' of the guide unit 14*a*. A respective characteristic quantity of a deformation in the sub-regions 20*a*, 20*a*' of the guide unit 14*a* is sensed by means of the sensors 22*a*, 22*a*', separately from each other in each case. The sensing unit 18*a* is designed to sense a direction of a mechanical stress in the sub-regions 20*a*, 20*a*' of the guide unit 14*a*. The sensing unit 18*a* in this case senses both a direction and an intensity of the deformation of the sub-regions 20*a*, 20*a*' of the guide unit 14*a*. In the case of a direction, a distinction is made only between two directions. A direction of the deformation of the sub-regions 20*a*, 20*a*' of the guide unit 14*a* in this case is determined by a plus or minus sign of the intensity of the deformation.

Furthermore, the manually guided garden care machine 10*a* has a computing unit 30*a*. The computing unit 30*a* is designed to control the drive unit 32*a*, to evaluate sensor data of the sensing unit 18*a*, and to evaluate a current operating characteristic quantity of the manually guided garden care machine 10*a*. The computing unit 30*a* is designed to control the drive unit 32*a*, realized as an assistance drive, for the purpose of moving the manually guided garden care machine 10*a*, to evaluate sensor data of the sensing unit 18*a*, and to evaluate a current operating characteristic quantity of the manually guided garden care machine 10*a*. For this purpose the computing unit 30*a* comprises sensor electronics for evaluating the sensor data of the sensing unit 18*a*, and speed control electronics for controlling the drive unit 32*a*. The computing unit 30*a* is designed to control the drive unit 32*a* of the manually guided garden care machine 10*a*, realized as an assistance drive, in dependence on a sensed deformation of the sub-regions 20*a*, 20*a*' of the guide unit 14*a* and in dependence on a sensed current operating characteristic quantity of the manually guided garden care machine 10*a*. The computing unit 30*a* in this case is designed to deduce an operator's wish for propelling assistance, from a sensed deformation of the sub-regions 20*a*, 20*a*' of the guide unit 14*a* and from a sensed current operating characteristic quantity of the manually guided garden care machine 10*a*. For this purpose the computing unit 30*a* is connected to the sensors 22*a*, 22*a*'. In a manner not shown further, the computing unit 30*a* is connected to the sensors 22*a*, 22*a*' via cables. In principle, however, a wireless connection would also be conceivable. In addition, in a manner not shown further, the computing unit 30*a* is connected to the drive unit 32*a* via cables. In principle, however, a wireless connection would also be conceivable. The computing unit 30*a* adds the forces sensed by the sensors 22*a*, 22*a*' during operation, and controls the drive unit 32*a* accordingly for the purpose of moving the manually guided garden care machine 10*a*. In addition, the computing unit 30*a* in this case is designed to deduce a user's requirement for assistance, to facilitate a current pushing operation, from a sensed deformation and from a sensed current operating characteristic quantity. The computing unit 30*a* is arranged in a transverse rod 84*a* of the guide unit 14*a*. Interference to the computing unit 30*a* by the base unit 12*a* of the manually guided garden care machine 10*a* can thereby be avoided. In principle, however, a differ-ent arrangement, considered appropriate by persons skilled in the art, would also be conceivable. In order to achieve an optimal operator perception, a firmware control algorithm of the computing unit 30*a* must provide a processing of the measured force and a subsequent control of the drive unit 32*a*, for moving the manually guided garden care machine 10*a*, that corresponds substantially to the expectations of the operator. An ADR (Attack, Decay and Release) algorithm is provided for this purpose. The control of the rise rate (Attack) ensures that the manually guided garden care machine 10*a* achieves a required speed as rapidly as possible. A slower drop-off rate (Decay) ensures that the speed remains relatively constant over uneven ground. Release sensing (Release) allows the firmware to identify when the operator pulls back the manually guided garden care machine 10*a*, and to deactivate the drive unit 32*a* accordingly. The manually guided garden care machine 10*a* can thereby be stopped without the necessity of releasing an actuating element 38*a*.

The manually guided garden care machine 10*a* also has a further computing unit 83*a*, designed to control the drive unit 42*a* for the mower unit 44*a*. The further computing unit 83*a* is connected to the computing unit 30*a* via cables, in a manner not shown further. In principle, however, a wireless connection would also be conceivable. The further computing unit 83*a* is arranged in the base unit 12*a* of the manually guided garden care machine 10*a*.

The manually guided garden care machine 10*a* additionally has a setting element 34*a*. The setting element 34*a* is constituted by a rotary sleeve, in particular a rotary handle. The setting element 34*a* in this case is realized in the manner of a motorcycle handle. The setting element 34*a* is arranged in a rotatable manner on a transverse rod 84*a* of the guide unit 14*a*. The transverse rod 84*a* is parallel to the handle 16*a*. The transverse rod 84*a* is arranged in a transition region between the handle 16*a* and the guide rods 26*a*, 26*a*'. The transverse rod 84*a* is connected to the guide rods 26*a*, 26*a*', at the ends of the guide rods 26*a*, 26*a*' that face toward the handle. The setting element 34*a* is designed to set a sensitivity of the sensing unit 18*a*. The setting element 34*a* is designed to set a factor by which the deformation of the sub-regions 20*a*, 20*a*' of the guide unit 14*a* is taken into account for calculation of propelling assistance. The setting element 34*a* is realized as a threshold transducer for setting the sensitivity of the sensors 22*a*, 22*a*'. The setting element 34*a* is used by an operator to input a factor by which the operator's weight and/or strength and/or required degree of assistance is taken into account. For this purpose, differing stages may be set on the setting element 34*a*. The setting element 34*a* is realized as an electric element. In a manner not shown further, the setting of the setting element 34*a* is transmitted via lines to the computing unit 30*a*.

The manually guided garden care machine 10*a* additionally has an actuating unit 36*a* arranged on the guide unit 14*a*. The actuating unit 36*a* is arranged in a transition region between the handle 16*a* and the guide rods 26*a*, 26*a*'. The actuating unit 36*a* is arranged on the transverse rod 84*a*. The actuating unit 36*a* comprises a movably mounted actuating element 38*a*. The actuating element 38*a* is movably mounted on the transverse rod 84*a*. The actuating element 38*a* is realized in the form of a bail. The actuating element 38*a* is substantially parallel to the handle 16*a*. A shape of the actuating element 38*a* corresponds substantially to a shape of the handle 16*a*. For the purpose of actuating the actuating element 38*a*, the actuating element 38*a* is swiveled in the direction of the handle 16*a*, until the actuating element 38*a* bears against the handle 16*a*. The actuating element 38*a* is designed to activate a stand-by operating state 90a, 92a. The stand-by operating state 90a, 92a of the manually guided garden care machine 10a is activated by the actuating element 38a in an actuated state. The stand-by operating state 90a of the propelling assistance, in particular of the drive unit 32a of the propelling assistance, is activated by the actuating element 38a in an actuated state. Furthermore, the stand-by operating state 92a of the drive unit 42a for the mower unit 44a is activated by the actuating element 38a in an actuated state. In order to keep the stand-by operating state 90a, 92a, the actuating element 38a must be kept in an actuated state. It is thereby possible to provide, in particular, an actuating element 38a that provides additional operating safety. The actuating unit 36a additionally has a second actuating element 86a. The second actuating element 86a is arranged at an end face of the transverse rod 84a. The second actuating element 86a is constituted by a button, which must be pressed to effect actuation. The second actuating element 86a is designed to activate and/or deactivate the mower unit 44a and the associated drive unit 42a. Actuation of the second actuating element 86a causes the drive unit 42a to be activated, or to be deactivated if the drive unit 42a has already been activated. The second actuating element 86a can only be actuated if the actuating element 38a has already been actuated.

In principle, if a force sensing resistor is used as sensors 22a, 22a', it would be possible to dispense with the actuating element 38a. In comparison with other sensors, a force sensing resistor has the advantage that it can be used to activate electronics by the action of pressure upon the sensor.

Figure 6:
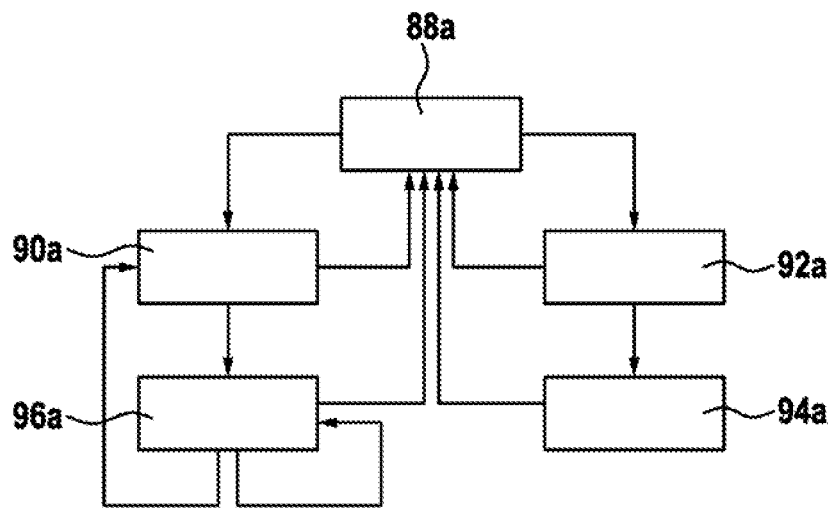

FIG. 6 shows a schematic flow diagram of a method for operating the manually guided garden care machine 10a. In a first state 88a of the manually guided garden care machine 10a, the drive unit 32a of the propelling assistance and the drive unit 42a for the mower unit 44a are fully deactivated. If the actuating element 38a of the actuating unit 36a is then actuated, i.e. in particular pressed against the handle 16a, the drive unit 32a of the propelling assistance is put into a stand-by operating state 90a. Consequently, as a result of actuation of the actuating element 38a of the actuating unit 36a of the manually guided garden care machine 10a, a travel assistance mode is put into a stand-by operating state 90a, 92a. In addition, as a result of actuation of the actuating element 38a of the actuating unit 36a, the drive unit 42a for the mower unit 44a is put into a stand-by operating state 92a. If the drive unit 42a for the mower unit 44a is in the stand-by operating state 92a and the second actuating element 86a is actuated, the drive unit 42a is put into an activated state 94a. Renewed actuation of the second actuating element 86a causes the drive unit 42a for the mower unit 44a to be deactivated again. It is thereby possible, for example, to travel over areas that are not to be mown. If the drive unit 32a of the propelling assistance is in the stand-by operating state 90a and the manually guided garden care machine 10a is pushed, by means of the handle 16a, in such a manner that a sensed deformation of the connection elements 70a, 70a' exceeds a predefined threshold, the drive unit 32a is activated. During operation of the drive unit 32a, a force acting upon the connection elements 70a, 70a' is monitored continuously, in a step 96. The drive unit 32a of the manually guided garden care machine 10a in this case is controlled in dependence on a deformation of the sub-regions 20a, 20a' of the guide unit 14a of the manually guided garden care machine 10a. The drive unit 32a of the manually guided garden care machine 10a is controlled in dependence on a value of a sensed deformation of the sub-regions 20a, 20a' of the guide unit 14a. A speed of the manually guided garden care machine 10a is controlled in dependence on the deformation sensed by the sensors 22a, 22a'. In addition, braking may be initiated in dependence on the deformation sensed by the sensors 22a, 22a'. In order to effect braking, an operator can pull on the handle 16a, such that a negative deformation is sensed by the sensors 22a, 22a'. If the sensed deformation of the connection elements 70a, 70a' falls below the predefined threshold, the drive unit 32a of the propelling assistance is put back into the stand-by operating state 90a. Owing to the arrangement of the sensors 22a, 22a', it can also be ensured that the drive unit 32a of the propelling assistance is put back into the stand-by operating state 90a if an operator, for example, raises the front wheels 58a of the manually guided garden care machine 10a to effect rapid turning. This is sensed by the sensors 22a, 22a' as a negative deformation, such that the deformation is below the threshold. It is therefore possible to prevent the drive unit 32a from being activated in this state. A high degree of safety can be ensured. If the actuating element 38a of the actuating unit 36a is released during operation, the manually guided garden care machine 10a is put into the first state 88a, in which the drive unit 32a of the propelling assistance and the drive unit 42a for the mower unit 44a are fully deactivated.

It would also be conceivable for respectively one deformation, sensed by the sensors 22a, 22a', to be monitored separately during step 96. In this case it would be conceivable, in particular, to sense in step 96 whether the operator is going round a bend, i.e. whether one of the sensors 22a, 22a' is sensing a greater deformation than the other. This could be picked up, for example, by the computing unit 30a, which in turn could individually control each of the two driving wheels 56a. The separate controlling of the driving wheels 56a may be effected, for example, via a transmission, or by division of the drive unit 32a into one drive unit for each of the driving wheels 56a.

In addition, for the purpose of calibrating the sensors 22a, 22a', a zero balancing may be effected, for example, in such a manner that the actuating element 38a is opened and closed several times in succession with a defined number and in a defined time period. Following a short delay, a current zero point of the sensors 22a, 22a' is read-in automatically, and the measurement values are input into a speed-control software of the computing unit 30a.

In principle, a method may also be necessary for setting the gain for each of the sensors 22a, 22a' in the speed-control software, in order to achieve optimal control if an automatically set value is not sufficient. For this purpose, forces having corresponding values for calibration with weights and deflection rollers may be applied to the guide unit 14a. The resulting values of the sensors 22a, 22a' are then used to calculate optimal gain values, and to store them in the speed-control software of the computing unit 30a.

Figure 7:
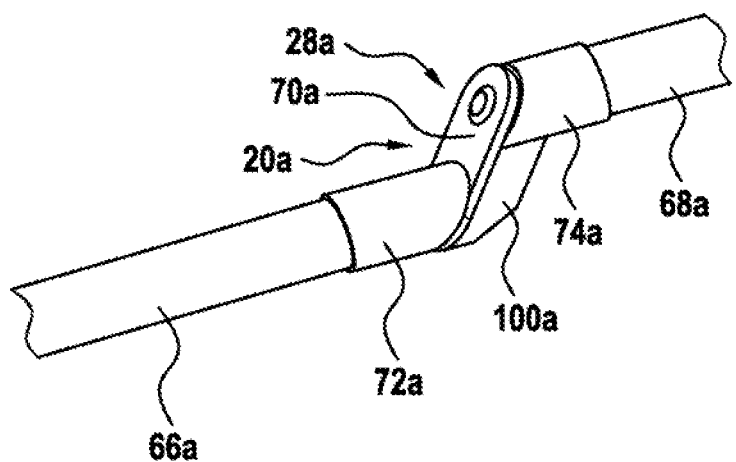

Additionally or alternatively, FIG. 7 shows an additional cover 100a for protecting the sensors 22a, 22a'. FIG. 7 shows only one cover 100a, in particular one cover 100a being provided for each sensor 22a, 22a'. The covers 100a are in each case arranged on a back side of the connection elements 70a, 70a'. The covers 100a are each designed to protect the sensors 22a, 22a' from mechanical damage or water damage. Moreover, the covers 100a also provide additional strain relief when a cable, leading to the sensors 22a, 22a', is pulled. The covers 100a are each constituted by a plastic cap that is screw-connected to the respective connection element 70a, 70a'.

Two further exemplary embodiments of the disclosure are shown in FIGS. 8 to 14. The descriptions and the drawings that follow are limited substantially to the differences between the exemplary embodiments, and in principle reference may also be made to the drawings and/or the description of the other exemplary embodiments, in particular of FIGS. 1 to 7, in respect of components that have the same designation, in particular in respect of components denoted by the same references. To distinguish the exemplary embodiments, the letter a has been appended to the references of the exemplary embodiment in FIGS. 1 to 7. In the exemplary embodiments of FIGS. 8 to 14, the letter a has been replaced by the letters b and c.

Figure 8:
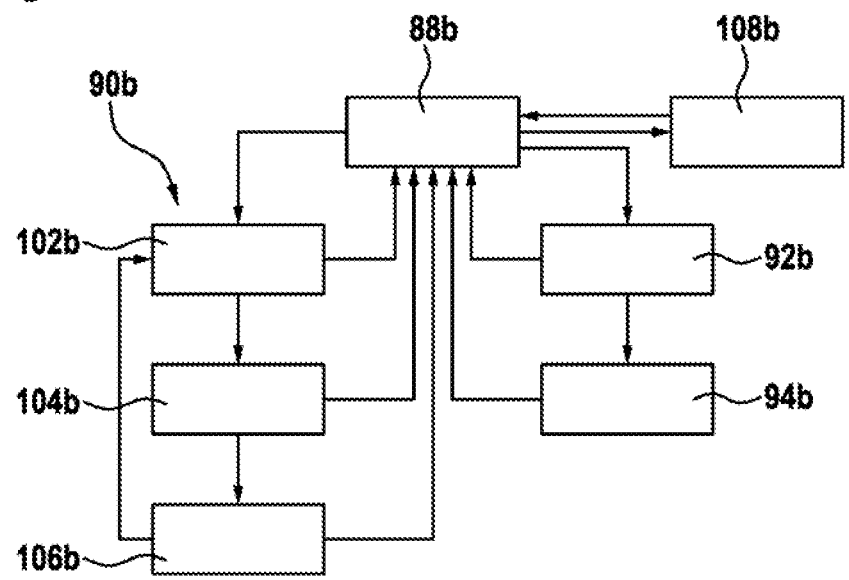

FIG. 8 shows a schematic flow diagram of a method for operating an alternative manually guided garden care machine 10*b*. In a first state 88*b* of the manually guided garden care machine 10*b*, a drive unit of the propelling assistance and the drive unit for the mower unit are fully deactivated. If an actuating element 38*b* of an actuating unit 36*b* is then actuated, i.e. in particular pressed against a handle 16*b*, the drive unit of the propelling assistance is put into a stand-by operating state 90*b*. Consequently, as a result of actuation of the actuating element 38*b* of the actuating unit 36*b* of the manually guided garden care machine, a travel assistance mode is put into a stand-by operating state 90*b*, 92*b*. In addition, as a result of actuation of the actuating element 38*b* of the actuating unit 36*b*, the drive unit for the mower unit is put into a stand-by operating state 92*b*. If the drive unit for the mower unit is in the stand-by operating state 92*b* and a second actuating element 38*b* is actuated, the drive unit is put into an activated state. If the drive unit of the propelling assistance is in the stand-by operating state 90*b*, there follows a staring algorithm 102*b*, which monitors when the garden care machine 10*b* is pushed forward by the operator, and the drive unit of the propelling assistance must therefore be started. The starting algorithm 102*b* is performed continuously during the stand-by operating state 90*b*, and is designed to start the drive unit of the propelling assistance automatically. When the drive unit of the propelling assistance has been started, there follows a speed regulation algorithm 104*b*, which regulates the speed of the manually guided garden care machine 10*b* in dependence on the operator. During the speed regulation algorithm 104*b*, a stopping algorithm 106*b* is also performed, which monitors when the garden care machine 10*b* is braked by the operator and the drive unit of the propelling assistance therefore must be stopped. The stopping algorithm 106*b* is performed continuously during the speed regulation algorithm 104*b*, and is designed to stop the drive unit of the propelling assistance automatically. The starting algorithm 102*b*, the speed regulation algorithm 104*b* and the stopping algorithm 106*b* are each performed by the computing unit of the manually guided garden care machine 10*b*.

In addition, an offset calibration 108*b* of the at least one sensor of the at least one sensing unit 18*b* is performed automatically during operation, between at least two travel mode phases. The offset calibration 108*b* is performed in the first state 88*b*, between two travel mode phases.

Figure 9:
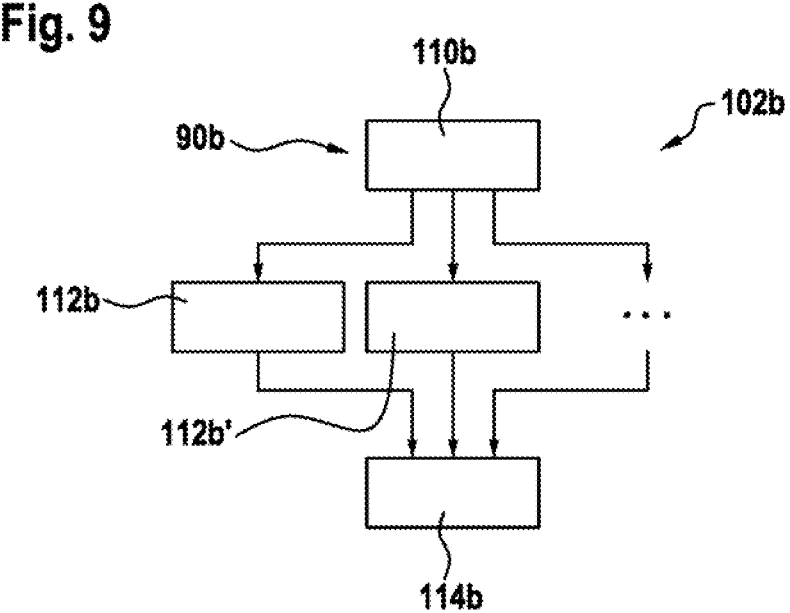

FIG. 9 shows a schematic flow diagram of the starting algorithm 102*b* of the manually guided garden care machine 10*b*. In the case of the starting algorithm 102*b* of the method, the drive unit of the manually guided garden care machine 10*b*, in the stand-by operating state 90*b*, is started in dependence on a usage behavior parameter. The drive unit of the manually guided garden care machine 10*b* in this case is started upon sensing of at least one defined behavior of usage of the garden care machine 10*b* by the operator. Stored on the computing unit of the garden care machine 10*b* for this purpose are a plurality of starting behavior profiles. The starting behavior profiles in this case represent differing usage types. The starting behavior profiles in this case are each defined over a measurement window of the sensing unit 18*b*, having a specific number of measurement points, within which window a specific number of measurement points must exceed a predefined minimum force in order to fulfill the corresponding starting behavior profile. Each starting behavior profile considers a fixed number of successive force samples, wherein the drive unit starts if a specific number of force samples within a measurement window lies above a set force value. In a first method step 110*b* of the starting algorithm 102*b*, the measurement data of the sensing unit 18*b* are monitored by means of the computing unit. Then, in further method steps 112*b*, 112*b*', the measurement data are in each case compared with the stored starting behavior profiles. If at least one of the starting behavior profiles is fulfilled, in a further method step 114*b* the drive unit of the propelling assistance is started. The described starting algorithm 102*b* is based, exemplarily, on two starting behavior profiles, but in principle, as indicated in FIG. 9, yet further starting behavior profiles are also conceivable. A first starting behavior profile exemplarily has a measurement window having a duration of 37.5 ms and three measurement points. A minimum force value of the first starting behavior profile, that must be achieved to fulfill the profile in the case of three of the three measurement points of the measurement window, is 40 N. The first starting behavior profile is designed for an operator that pushes the garden care machine 10*b* very rapidly and strongly. By contrast, a second starting behavior profile exemplarily has a measurement window having a duration of 50 ms and four measurement points. A minimum force value of the second starting profile, that must be achieved to fulfill the profile in the case of four of the four measurement points of the measurement window, is 30 N. The second staring behavior profile is designed for an operator that pushes the garden care machine 10*b* in a leisurely manner. In the case of both starting behavior profiles, all successive measurement points must attain the minimum force value. Accordingly, in principle, a simpler algorithm, in which all successive force samples in the profile window exceed the triggering force, would suffice for starting. In principle, yet further and/or alternative starting behavior profiles, considered appropriate by persons skilled in the art, are also conceivable. These starting profiles prevent the drive unit of the garden care machine 10*b* from starting in the stand-by operating state 90*b* if the garden care machine 10*b* is being pulled backward. Any measurement of force in the forward direction, for example due to a jolt of a ground undulation, is ignored, since the number of force measurements will not fulfill the number of triggering force samples required for each of the starting profiles.

When the drive unit of the propelling assistance has been activated, the speed of the garden care machine 10*b* is regulated in dependence on an operator's requirement, by means of the speed regulation algorithm 104*b*. For this purpose, in a travel mode, the deformation of the sub-region of the guide unit 14*b* is regulated to a defined value by control of the drive unit. In a travel mode, the force that is exerted upon the guide unit 14*b* by an operator and that is sensed by means of the sensing unit 18*b* is regulated to a defined value of approximately 4 N, in particular to a value range of from 4 N to 7 N, by control of the drive unit. For the purpose of regulating the force, exerted upon the guide unit 14*b* by an operator, to the defined value or value range, the drive unit is accelerated upon the defined value range being exceeded, and is braked upon the defined value range being under-run. For this purpose, the force applied by the operator is measured by means of the sensing unit 18b. A measurement in this case is effected, exemplarily, at 80 Hz. Each measurement value is then used to set the speed of the garden care machine 10b. If the measured force is over a threshold value of 7 N, the garden care machine 10b is accelerated. If the measured force is below a threshold value of 4 N, the garden care machine 10b is braked. In this case, differing acceleration values are assigned to differing force ranges and to differing speed values. As the difference, of the currently present force in relation to the exceeded threshold, increases, the amount of acceleration increases, in particular in a stepped manner. In addition, a maximally possible acceleration decreases as a current speed increases. In the following table, possible acceleration values are shown, exemplarily, in dependence on a current speed and in dependence on a currently existing force.

If the garden care machine 10b travels over ground undulations in the grass, these affect the force measurements considerably. In order to ensure a smooth response in the speed regulation, an acceleration and braking profile is used to limit a rate of speed change at which the speed can change upon each force measurement. The braking profile in this case corresponds to the negative of the acceleration profile. In addition, as speed increases, the profiles reduce a rate at which the speed can change, such that a sensitivity decreases as speed increases. It can thereby be achieved that ground undulations have only a slight effect upon the travel behavior, and also that forceful operators must apply a large amount of force in order to bring the garden care machine 10b to the required high speed.

In addition, during the travel mode, a maximum speed of the drive unit of the manually guided garden care machine 10b is adapted in dependence on an operating state of the mower unit of the garden care machine 10b. The maximum speed of the drive unit of the propelling assistance of the manually guided garden care machine 10b in this case is reduced when the mower unit is running. If, during mowing, the speed of the garden care machine 10b is excessively high, an optimum mowing result can no longer be ensured, since both grass cutting and grass pick-up no longer function optimally. If the mower unit has been deactivated, on the other hand, the maximum speed of the drive unit of the manually guided garden care machine 10b is preferably increased again.

Figure 10:
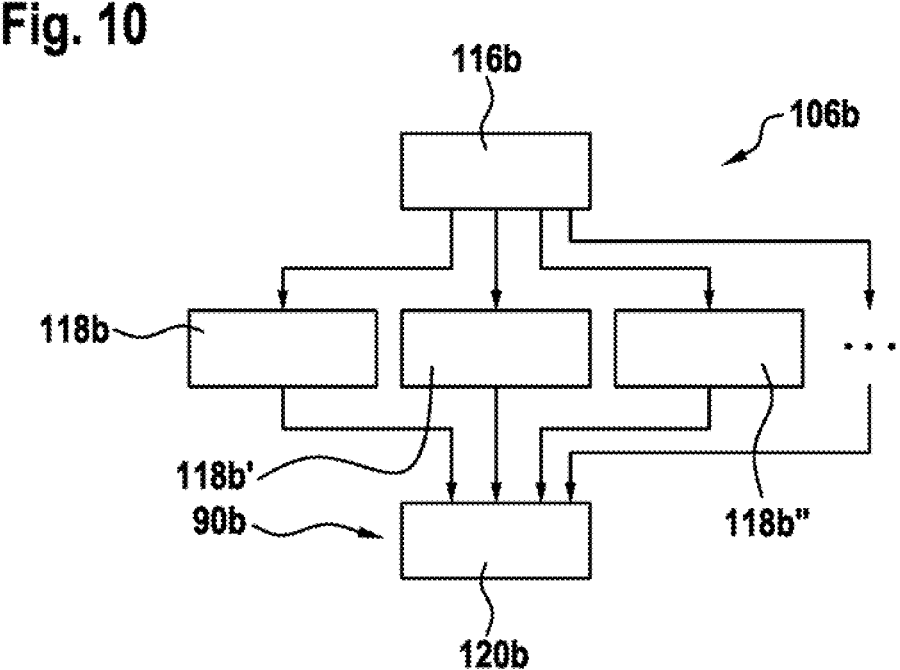

FIG. 10 shows a schematic flow diagram of the stopping algorithm 106b of the manually guided garden care machine 10b. In the case of the stopping algorithm 106b of the method, the drive unit of the manually guided garden care machine 10b, in a travel mode, is stopped in dependence on at least one usage behavior parameter. The stopping algorithm 106b is performed during the entire travel mode. The stopping algorithm 106b is performed in parallel with the speed regulation algorithm 104b. The drive unit of the manually guided garden care machine 10b, in the travel mode, is stopped upon sensing of at least one defined behavior of usage of the garden care machine 10b by the operator. Stored on the computing unit of the garden care machine 10b for this purpose are a plurality of stopping behavior profiles. The stopping behavior profiles in this case represent differing usage types. The stopping behavior profiles in this case are each defined over a measurement window of the sensing unit 18b, having a specific number of measurement points, within which window a specific number of measurement points must under-run a predefined minimum force in order to fulfill the corresponding stopping behavior profile. Each stopping behavior profile considers a fixed number of successive force samples, wherein the drive unit stops if a specific number of force samples within a measurement window lies below a set force value. In a first method step 116b of the stopping algorithm 106b, during the travel mode, the measurement data of the sensing unit 18b are monitored by means of the computing unit. Then, in further method steps 118b, 118b', 118b'', the measurement data are in each case compared with the stored stopping behavior profiles. If at least one of the stopping behavior profiles is fulfilled, in a further method step 120b the drive unit of the propelling assistance is stopped. The drive unit of the propelling assistance is now back in the stand-by operating state 90b. The described stopping algorithm 106b is based, exemplarily, on three starting behavior profiles, but in principle, as indicated in FIG. 10, yet further stopping behavior profiles are also conceivable. A first stopping behavior profile exemplarily has a measurement window having a duration of 100 ms and eight measurement points. A minimum force value of the first stopping behavior profile, that must be under-run, or achieved, to fulfill the profile in the case of seven of the eight measurement points of the measurement window, is −40 N. A second stopping behavior profile exemplarily has a measurement window having a duration of 300 ms and 24 measurement points. A negative minimum force value of the second stopping behavior profile, that must be under-run, or achieved, to fulfill the profile in the case of 23 of the 24 measurement points of the measurement window, is −30 N. A third stopping behavior profile exemplarily has a measurement window having a duration of 875 ms and 70 measurement points. A negative minimum force value of the third stopping behavior profile, that must be under-run, or achieved, to fulfill the profile in the case of 62 of the 70 measurement points of the measurement window, is −5 N. In principle, yet further and/or alternative stopping behavior profiles, considered appropriate by persons skilled in the art, are also conceivable. Differing scenarios, i.e. the manner in which an operator pulls back the garden care machine 10b to effect stopping, can be covered by the various stopping behavior profiles. In particular, the garden care machine 10b in this case is stopped more rapidly if the operator pulls strongly on the guide unit 14b, and is stopped more slowly if the operator pulls gently on the guide unit 14b. Since the scenarios for stopping the drive unit of the garden care machine 10b vary more than in the case of starting the drive unit of the garden care machine 10b, exemplarily three stopping behavior profiles and only two starting behavior profiles are provided.

The starting algorithm 102b and the stopping algorithm 106b in this case must in particular be adapted so as to deal with all scenarios that can occur with the garden care machine 10b. In particular, ideal operation can be provided, both for mowing on long straight lines and on very short, back-and-forth mowing segments, by the starting algorithm 102b and the stopping algorithm 106b.

Figure 11:
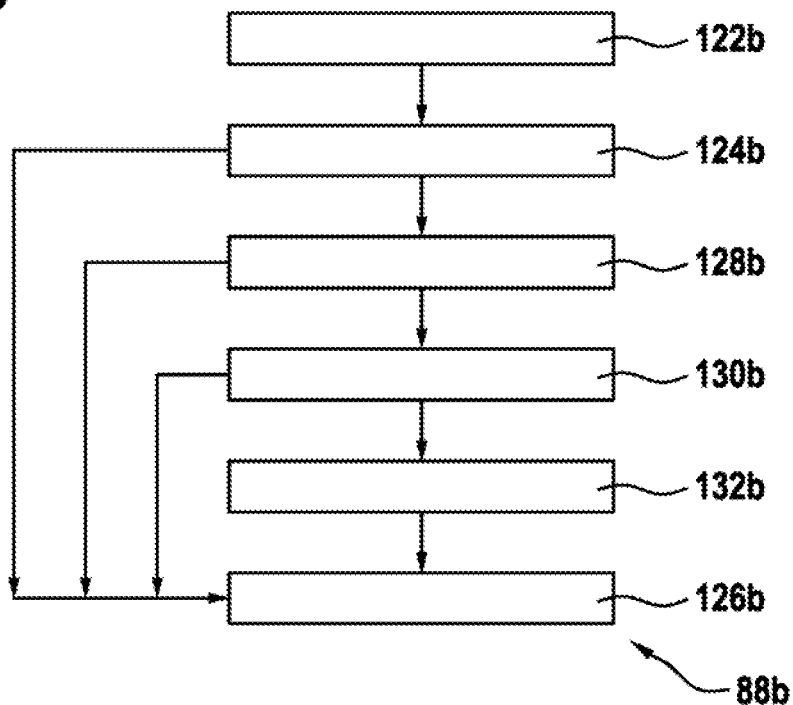

FIG. 11 shows a schematic flow diagram of the offset calibration 108b of the manually guided garden care machine 10b. The offset calibration 108b is performed automatically when the manually guided garden care machine 10b is in an activated state, during a stationary phase of the manually guided garden care machine 10b. The offset calibration 108b serves to calibrate the sensors of the sensing unit 18b. In the offset calibration 108b it is checked, in a first method step 122b, whether the actuating element 38b of the actuating unit 36b is unactuated. If the actuating element 38b is unactuated for seven seconds, in a second method step 124b exemplarily 90 force measurements are performed by the sensors of the sensing unit 18b. If a force distribution indicates that the garden care machine 10b is being moved, the offset calibration 108b is discontinued and, in a further method step 126b according to the first state 88b of the manually guided garden care machine 10b, it is waited unit the actuating element 38b is closed. If the force distribution indicates that the garden care machine 10b is completely at a standstill, the calibration offsets of the sensors are calculated in a third method step 128b. If it is ascertained that a recalibration is not necessary, since a deviation between a currently stored offset and the calculated calibration offset is too small, the further method step 126b follows, and the offset calibration 108b is discontinued. If the calculated calibration offset differs from the current stored offset by more than 5%, the supply voltage of the garden care machine 10b is checked in a fourth method step 130b. If the supply voltage is less than 33 V, the further method step 126b follows, and the offset calibration 108b is discontinued. If the supply voltage of the garden care machine 10b is greater than or equal to 33 V, a corrected calibration offset of the sensors is written to a memory unit, in particular a flash memory, of the computing unit, in a fifth method step 132b. Preferably, however, the corrected calibration offset has a deviation of approximately 0.5% of the stored offset value in the direction of the calculated calibration offset. It is thereby possible to compensate measurement errors in the offset calibration 108b, and to achieve a uniform adaptation of the offset value. When writing to the storage unit is concluded, the further method step 126b follows, and the offset calibration 108b is concluded.

Figure 12:
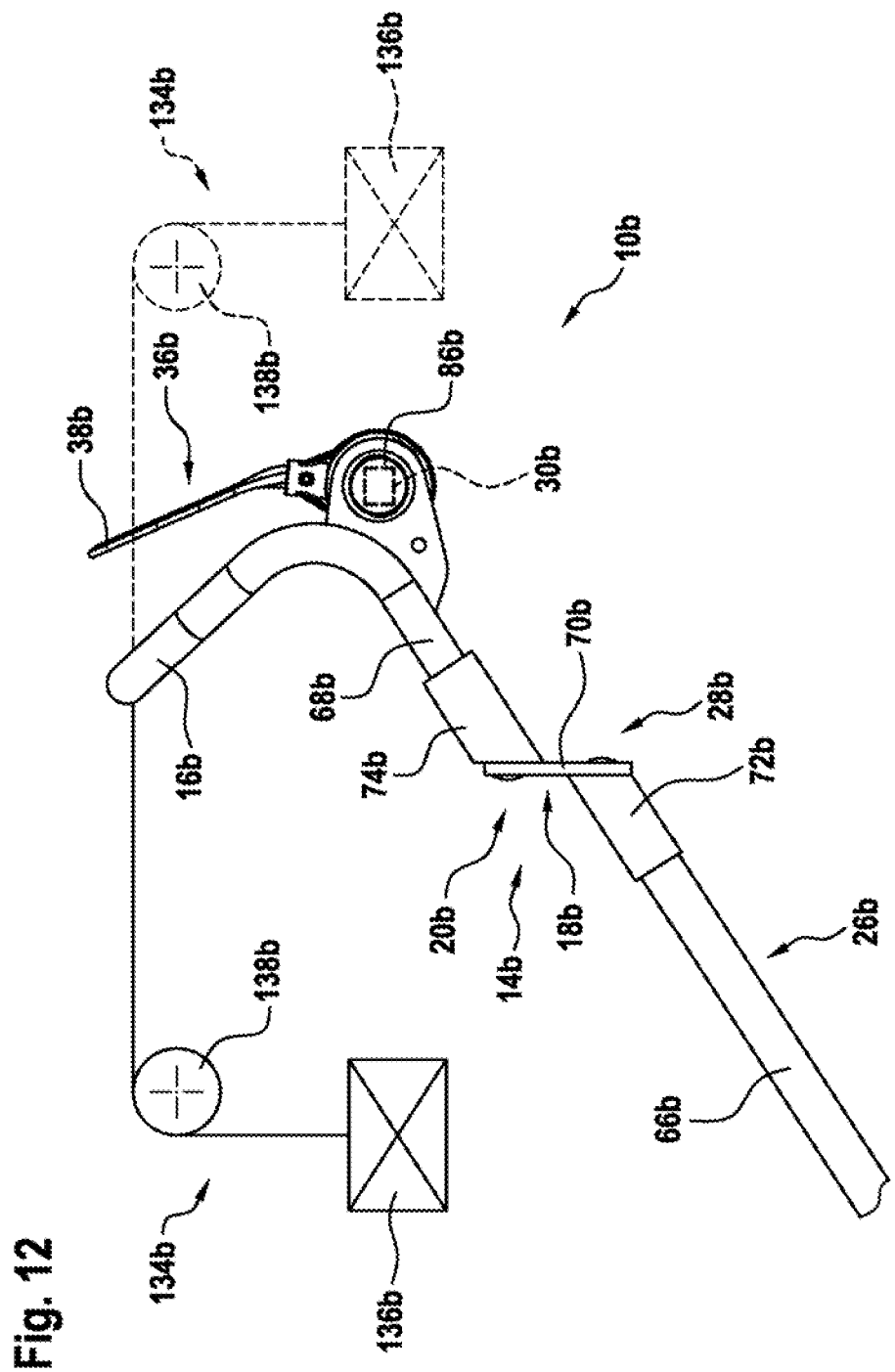

In addition, the sensors of the sensing unit 18b are already calibrated prior to sale, in particular ex works. The sensors must be factory calibrated in order to ensure that they deliver the correct force measurement to the computing unit of the garden care machine 10b. The factory calibration measures the gain and the offset of the sensors of the sensing unit 18b, and programs the calculated values into the memory unit of the computing unit. For this purpose, the computing unit has a communication interface, not shown further, via which the computing unit and the sensing unit 18b can be connected to a computer. An application on the computer, in particular a Windows application, guides a worker for this purpose through the steps of an ex works calibration. The offset of each sensor of the sensing unit 18b is calculated by monitoring of the measurement data of the sensors without a force applied to the guide unit 14b. The gain of the sensors of the sensing unit 18b is calculated by monitoring of the measurement data of the sensors without a force applied to the guide unit 14b. For this purpose, in a calibration structure 134b, a weight 136b having a known mass is coupled centrally, via an idler pulley 138b, to the guide unit 14b, such that a force of the weight 136 acts horizontally on the guide unit 14b. This is performed both in the forward direction, as represented in FIG. 12, and in the backward direction, as indicated by a broken line in FIG. 12. The weight 136b has, for example, a weight force of 20 N (FIG. 12).

Figure 13:
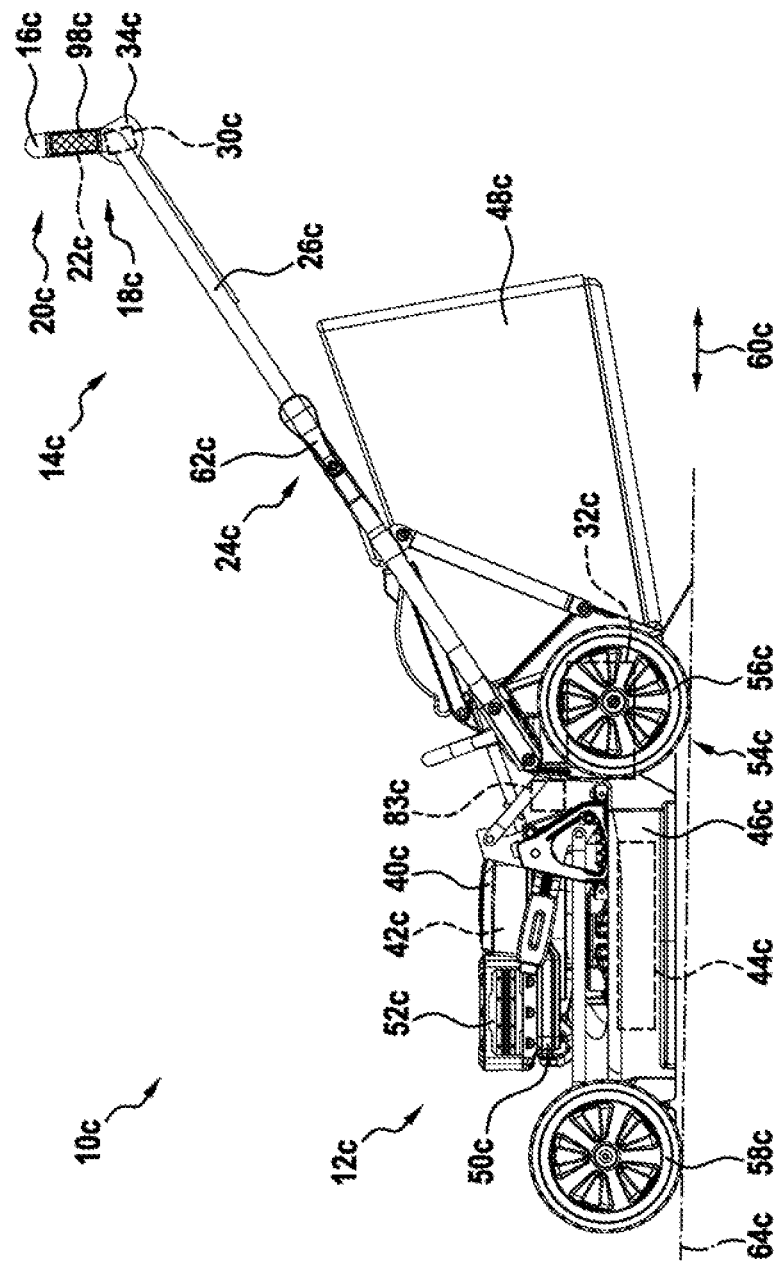
Figure 14:
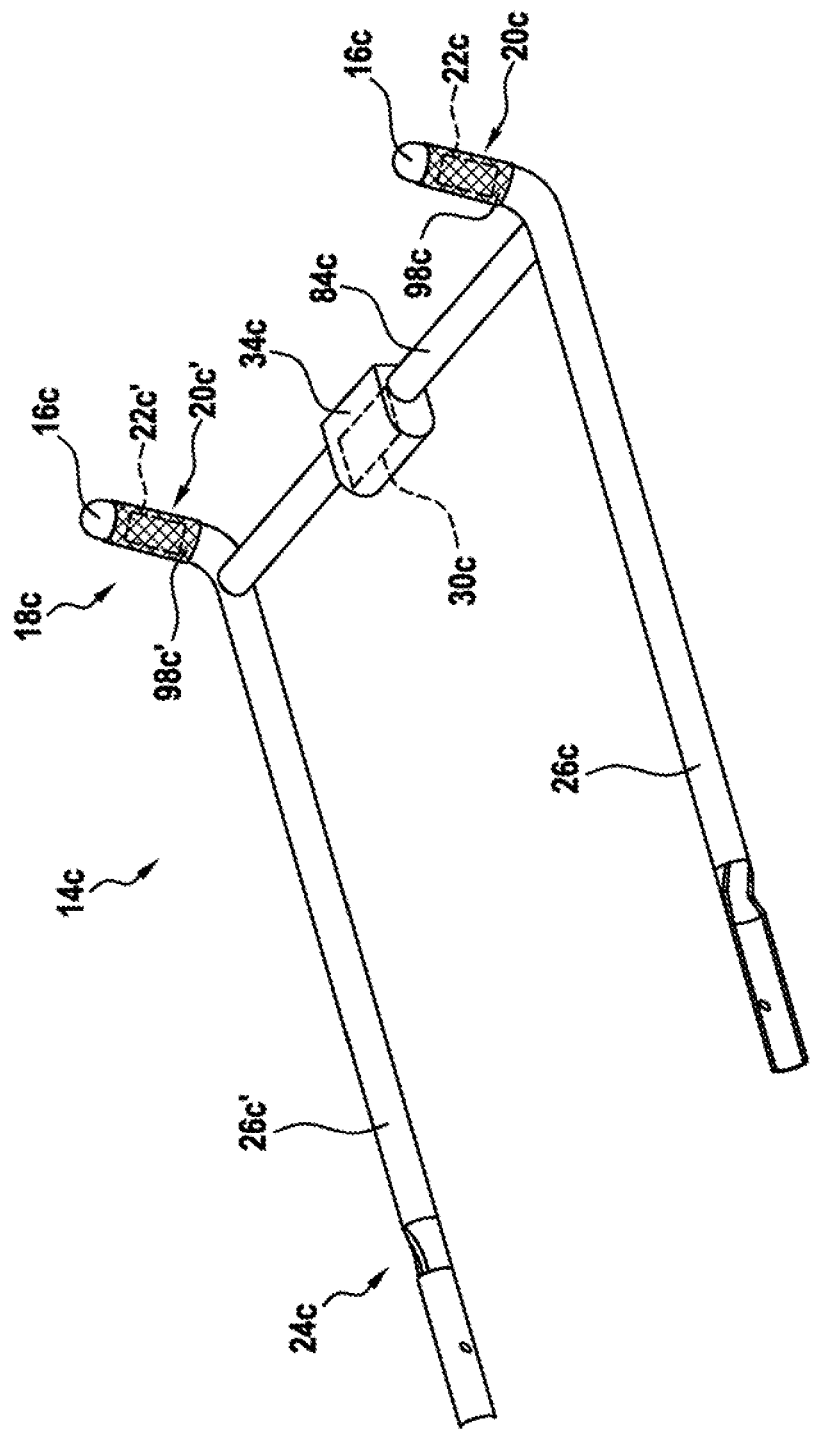

FIG. 13 shows a garden care machine 10c, which is realized as a lawnmower. The garden care machine 10c has a base unit 12c. The garden care machine 10c additionally has a drive unit 42c. For the purpose of moving the garden care machine 10c on a work area, in particular a grassed area, the garden care machine 10c has at least one running-gear unit 54a.

The manually guided garden care machine 10c additionally has a guide unit 14c. The guide unit 14c is designed to directly guide the garden care machine 10c. By means of the guide unit 14c, the garden care machine 10c is moved in a regular manner, in particular pushed, during operation. The guide unit 14c is realized substantially as a U shape, the two ends being fastened to the base unit 12c. The guide unit 14c has two handles 16c, 16b'. The handles 16c, 16b' are each constituted by a handle lever. The handles 16c, 16b' are connected via a transverse rod 84c. The handles 16c, 16b' are designed to be contacted by the operator during operation of the garden care machine 10c. The handles 16c, 16b' each extend substantially perpendicularly in relation to a direction of main extent 60c of the garden care machine 10c. The handles 16c, 16b' additionally extend substantially perpendicularly in relation to a ground plane 64c of the garden care machine 10c. The handles 16c, 16b' each have a respective handle sleeve 98c, 98b'. The handle sleeves 98c, 98b' are each composed of an elastic material. The handle sleeves 98c, 98b' are designed to be directly contacted by an operator. The guide unit 14c additionally has two guide rods 26c, 26b'. The guide rods 26c, 26b' are realized substantially in the form of a rod. The guide rods 26c, 26b' are composed substantially of tubes. The tubes have a diameter of, for example, 26 mm. Various materials, considered appropriate by persons skilled in the art, are conceivable, such as, for example, a carbon fiber composite material, plastic or metal. The guide rods 26c, 26b' respectively adjoin one of the two handles 16c, 16b'. The guide rods 26c, 26b' extend substantially perpendicularly in relation to the transverse rod 84c. A direction of main extent of the guide rods 26c, 26b' extends in each case substantially perpendicularly in relation to the direction of main extent of the handle 16c. The guide rods 26c, 26b' extend from the handles 16c, 16b' to the base unit 12c. At an end that faces away from the handle 16c, the guide rods 26c, 26b' each form a region of connection 24c to the base unit 12c.

Furthermore, the garden care machine 10c has a sensing unit 18c. The sensing unit 18c is designed to sense an operator's wish for assistance in propelling the base unit 12c. The sensing unit 18c is designed to sense an operator's wish for assistance in moving the manually guided garden care machine 10c. In addition, the sensing unit 18c is designed to sense a deformation of at least one sub-region 20c, 20b' of the guide unit 14c. The sensing unit 18c is designed to sense a deformation of two mutually spaced apart sub-regions 20c, 20b' of the guide unit 14c. The sensing unit 18c is designed to sense a deformation of the handle sleeves 98c, 98b' of the handles 16c, 16b' of the guide unit 14c.

The sensing unit 18c has at least one sensor 22c, 22b'. The sensing unit 18c has at least one electrical sensor 22c, 22b'. The sensing unit 18a has two sensors 22c, 22b'. The sensors 22c, 22b' are each constituted by an electrical sensor. The sensors 22c, 22b' are designed to sense a deformation of the two mutually spaced apart sub-regions 20c, 20b' of the guide unit 14c. The sensors 22c, 22b' are each designed to sense a deformation of one of the two sub-regions 20c, 20b' of the guide unit 14c. The sensors 22c, 22b' are respectively arranged under the handle sleeves 98c, 98b'. Each of the sensors 22c, 22b' is arranged under respectively one of the handle sleeves 98c, 98b'. The electrical sensors 22c, 22b' of the sensing unit 18c are each constituted by a pressure sensor. The electrical sensors 22c, 22b' of the sensing unit 18c are each constituted by a piezoelectric sensor. In principle, however, a different realization of the sensors 22c, 22b', considered appropriate by persons skilled in the art, is also conceivable. In principle, however, it is also conceivable for the sensors 22c, 22b' each to comprise a plurality of piezoelectric sensors.

The sensing unit 18c is additionally designed to sense a characteristic quantity of a mechanical stress in the sub-regions 20c, 20b' of the guide unit 14c. The sensing unit 18c is designed to sense a characteristic quantity of the deformation of the sub-regions 20c, 20b' of the guide unit 14c. A respective characteristic quantity of a deformation in the sub-regions 20c, 20b' of the guide unit 14c is sensed by means of the sensors 22c, 22b', separately from each other in each case. The sensing unit 18c is designed to sense a direction of a mechanical stress in the sub-regions 20c, 20b' of the guide unit 14c. The sensing unit 18c in this case senses both a direction and an intensity of the deformation of the sub-regions 20c, 20b' of the guide unit 14c. In the case of a direction, a distinction is made only between two directions. A direction of the deformation of the sub-regions 20c, 20b' of the guide unit 14c in this case is determined by a plus or minus sign of the intensity of the deformation. The sensing unit 18c also senses mere gripping without a force being exerted in a direction. A stand-by operating state can thereby preferably be sensed.

Furthermore, the manually guided garden care machine 10c has a computing unit 30c. The computing unit 30c is designed to control the drive unit 32c, to evaluate sensor data of the sensing unit 18c, and to evaluate a current operating characteristic quantity of the manually guided garden care machine 10c. The computing unit 30c is designed to control the drive unit 32c, realized as an assistance drive, for the purpose of moving the manually guided garden care machine 10c, to evaluate sensor data of the sensing unit 18c, and to evaluate a current operating characteristic quantity of the manually guided garden care machine 10c. The computing unit 30c is designed to control the drive unit 32c of the manually guided garden care machine 10c, realized as an assistance drive, in dependence on a sensed deformation of the sub-regions 20c, 20b' of the guide unit 14c and in dependence on a sensed current operating characteristic quantity of the manually guided garden care machine 10c. For this purpose the computing unit 30c is connected to the sensors 22c, 22b'.

The manually guided garden care machine 10c additionally has a further computing unit 83c, designed to control the drive unit 42c for the mower unit 44c. The further computing unit 83c is arranged in the base unit 12c of the manually guided garden care machine 10c.

The manually guided garden care machine 10c additionally has a setting element 34c. The setting element 34c is arranged on the transverse rod 84c of the guide unit 14c. The setting element 34c is designed to set a sensitivity of the sensing unit 18c. The setting element 34c is designed to set a factor by which the deformation of the sub-regions 20c, 20b' of the guide unit 14c is taken into account for a calculation of propelling assistance.

The invention claimed is:

1. A manually guided garden care machine, comprising:
at least one base unit;
at least one guide unit including at least one handle supported by at least one sub-region; and
at least one sensing unit configured to sense a deformation of the at least one sub-region of the at least one guide unit resulting from a force applied to the at least one handle by an operator.

2. The manually guided garden care machine as claimed in claim 1, wherein the at least one sensing unit includes at least one sensor arranged in a central region of the at least one guide unit, between the at least one handle and a region of connection to the at least one base unit.

3. The manually guided garden care machine as claimed in claim 1, wherein the at least one sub-region of the at least one guide unit has a lesser bending stiffness in comparison with an adjoining region of the at least one guide unit.

4. The manually guided garden care machine as claimed in claim 1, wherein the at least one sensing unit includes at least one electrical sensor.

5. The manually guided garden care machine as claimed in claim 4, wherein the at least one electrical sensor of the at least one sensing unit includes a strain gauge.

6. The manually guided garden care machine as claimed in claim 1, wherein the at least one sensing unit is further configured to sense at least one characteristic quantity of a mechanical stress in the at least one sub-region of the at least one guide unit.

7. The manually guided garden care machine as claimed in claim 6, wherein the sensing unit is further configured to sense positive and negative mechanical stress in the at least one sub-region of the at least one guide unit.

8. The manually guided garden care machine as claimed in claim 1, wherein:
the at least one guide unit further includes at least one guide rod extending from the at least one handle to the at least one base unit and further includes at least one offset located in the at least one sub-region, and
the at least one sensing unit includes at least one sensor arranged in a region of the at least one offset.

9. The manually guided garden care machine as claimed in claim 1, further comprising:
at least one actuating unit arranged on the at least one guide unit and including at least one movably mounted actuating element configured to activate a stand-by operating state.

10. A method for operating a manually guided garden care machine including at least one guide unit and at least one propelling assistance unit, the method comprising:
supporting a handle of the at least one guide unit with a sub-region of the at least one guide unit; and
controlling a drive unit of the propelling assistance unit of the manually guided garden care machine based on a deformation of the sub-region of the at least one guide unit of the manually guided garden care machine.

11. The method as claimed in claim 10, further comprising:
actuating an actuating element of an actuating unit of the manually guided garden care machine in order to place a travel assistance mode into a stand-by operating state.

12. The method as claimed in claim 11, further comprising:
controlling the drive unit of the manually guided garden care machine in the stand-by operating state based on a value of the deformation of the sub-region of the at least one guide unit.

13. The method as claimed in claim 11, further comprising:
starting the drive unit of the propelling assistance unit of the manually guided garden care machine in the stand-by operating state based on at least one usage behavior parameter.

14. The method as claimed in claim 10, further comprising:
regulating the deformation of the sub-region of the at least one guide unit in a travel mode to a defined value or value range by controlling the drive unit of the propelling assistance unit.

15. The method as claimed in claim 10, further comprising:

stopping the drive unit of the propelling assistance unit of the manually guided garden care machine in a travel mode based on at least one usage behavior parameter.

16. The method as claimed in claim 10, further comprising:

performing an offset calibration of at least one sensor of at least one sensing unit of the manually guided garden care machine automatically during operation, between at least two travel mode phases.

17. The manually guided garden care machine as claimed in claim 1, wherein the manually guided garden care machine is a push lawnmower.

18. The method of claim 14, wherein regulating the deformation of the sub-region of the at least one guide unit comprises:

accelerating the drive unit when the deformation exceeds a first threshold; and maintaining speed when the deformation is reduced from above the first threshold to the defined value or value range.

19. The method of claim 14, wherein regulating the deformation of the sub-region of the at least one guide unit comprises:

decelerating the drive unit when the deformation falls beneath a first threshold; and maintaining speed when the deformation is increased from beneath the first threshold to the defined value or value range.

20. The manually guided garden care machine of claim 1, wherein:

the at least one guide unit is changeable from a first configuration wherein the at least one handle is supported by the at least one sub-region with no force applied to the at least one handle by the operator, to a second configuration whereat the at least one handle is supported by the at least one sub-region with the force applied to the at least one handle by the operator.

* * * * *